US011156841B2

(12) United States Patent
Ozawa

(10) Patent No.: US 11,156,841 B2
(45) Date of Patent: Oct. 26, 2021

(54) DISPLAY DEVICE, CONTROL PROGRAM FOR DISPLAY DEVICE, CONTROL METHOD FOR DISPLAY DEVICE, AND DISPLAY SYSTEM

(71) Applicant: SEIKO EPSON CORPORATION, Tokyo (JP)

(72) Inventor: Emi Ozawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/022,131

(22) Filed: Sep. 16, 2020

(65) Prior Publication Data

US 2021/0080728 A1 Mar. 18, 2021

(30) Foreign Application Priority Data

Sep. 17, 2019 (JP) .............................. JP2019-168108

(51) Int. Cl.
*G02B 27/01* (2006.01)

(52) U.S. Cl.
CPC .. *G02B 27/0172* (2013.01); *G02B 2027/0138* (2013.01); *G02B 2027/0178* (2013.01); *G02B 2027/0187* (2013.01)

(58) Field of Classification Search
CPC ........ G02B 27/0172; G02B 2027/0138; G02B 2027/0178; G02B 2027/0187
See application file for complete search history.

(56) References Cited

U.S. PATENT DOCUMENTS

| 9,594,249 B2* | 3/2017 | Saito ......................... G06T 3/60 |
| 10,540,015 B2* | 1/2020 | Li ............................. G06F 3/167 |
| 10,657,927 B2* | 5/2020 | Khoury .................... G06F 3/013 |
| 2016/0109703 A1* | 4/2016 | Nishizawa .............. G06F 3/013 345/8 |
| 2016/0116741 A1* | 4/2016 | Sato ...................... G02B 27/017 345/8 |
| 2017/0160801 A1* | 6/2017 | Miyaguchi ............ G06F 3/0304 |
| 2018/0176547 A1* | 6/2018 | Kobayashi ........... H04N 13/332 |
| 2018/0196505 A1* | 7/2018 | Nishizawa .............. G06F 3/012 |
| 2020/0241656 A1* | 7/2020 | Takahashi ............... G06F 3/013 |
| 2021/0004081 A1* | 1/2021 | Sugihara ............... G06T 19/006 |
| 2021/0072541 A1* | 3/2021 | Kim ...................... G06F 3/0346 |

FOREIGN PATENT DOCUMENTS

JP  2002-014300  1/2002

* cited by examiner

*Primary Examiner* — Ricardo Osorio
(74) *Attorney, Agent, or Firm* — JCIPRNET

(57) ABSTRACT

An HMD is an HMD mounted at a head of a user, and includes a display unit located at a left eye side and a right eye side of the user, and displaying a first image that is overlapped on an outside scene, a first detector detecting an inclination of the head, a first adjustment unit adjusting, based on a detection result of the first detector, a display region of the first image, and a second display control unit causing, based on an adjustment result of the first adjustment unit, the first image to be displayed in the display region.

11 Claims, 12 Drawing Sheets

DISPLAY DEVICE, CONTROL PROGRAM FOR DISPLAY DEVICE, CONTROL METHOD FOR DISPLAY DEVICE, AND DISPLAY SYSTEM

The present application is based on, and claims priority from JP Application Serial Number 2019-168108, filed Sep. 17, 2019, the disclosure of which is hereby incorporated by reference herein in its entirety.

BACKGROUND

1. Technical Field

The present disclosure relates to a display device, a control program for the display device, a control method for the display device, and a display system.

2. Related Art

Techniques have been known for displaying a display image along a horizontal direction without being affected by an inclination of a head, in a head-mounted display apparatus (see, for example, JP-A-2002-14300).

In the head-mounted display apparatus described in JP-A-2002-14300, a circular liquid crystal panel is provided as a circular display region on a display apparatus being a head-mounted display and mounted on the head, and a rectangular display region having an aspect ratio of 3:4 is provided so as to be inscribed therein. The inclination of the head is then detected by a sensor, and the rectangular display region is rotated and displayed so as to correct the inclination. Accordingly, a user can be caused to recognize as though an orientation of an image displayed in the display region is fixed to be horizontal, even when the head is inclined, and an entirety of the image can be displayed without omission.

In the head-mounted display apparatus described in JP-A-2002-14300, there was a case where in an image displayed in the display region, and an outside scene, overlapping with a position of a target object that the user wants to visually recognize occurs.

For example, when words of a performer are displayed as subtitles in the display region of the head-mounted display apparatus, while the user is watching a stage or the like, it is necessary to prevent the subtitle image from overlapping with the performer. However, in the head-mounted display apparatus described in JP-A-2002-14300, since the display region inclines in correspondence with the inclination of the head, there was a possibility that the subtitle image and the performer are visually recognized in an overlapping manner.

SUMMARY

An aspect for solving the above problem is a display device mounted at a head of a user, that includes a display unit located at at least one of a left eye side and a right eye side of the user, and configured to display a first image that is overlapped on an outside scene, a first detector configured to detect an inclination of the head, a first adjustment unit configured to, based on a detection result of the first detector, adjust a display region of the first image, and a display control unit configured to, based on an adjustment result of the first adjustment unit, cause the first image to be displayed on the display region.

In the above display device, a configuration may be adopted in which, an imaging unit configured to capture an image of the outside scene and generate a captured image is included, and the first adjustment unit adjusts, based on a position of a specific object included in the captured image, a display region of the first image.

The above display device may be configured to include a first determination unit configured to, based on the captured image, determine the specific object.

In the above display device described above, a configuration may be adopted in which, the first adjustment unit fixes a displayable region indicating a region, in which the first image is displayable, to the specific object, and adjusts the display region to be a region, where an image display region indicating a region in which the display unit displays an image overlaps the displayable region.

The above display device may be configured to include a second determination unit configured to, based on the captured image, determine the displayable region.

In the display device, a configuration may be adopted in which, the first image is an image displaying a character string, a second adjustment unit adjusting, based on an adjustment result of the first adjustment unit, the number of lines of the character string displayed in the display region is provided, and the display control unit displays by the number of lines the character string in the display region.

In the above display device, a configuration may be adopted in which, a determining unit configured to determine whether an entirety of the first image is able to be displayed in the display region, and when the determining unit determines that the entirety of the first image is not able to be displayed in the display region, the display control unit causes the first image to be displayed in the display region in a time-division manner.

In the above display device, a configuration may be adopted in which, a second detector configured to detect an orientation of the head in a left-right direction is provided, and the display control unit displays, based on a detection result of the second detector, a second image different from the first image at the display unit.

In the above display device, a configuration may be adopted in which, the display control unit displays, when an angle formed by a front direction of the user and an orientation of the head in the left-right direction is equal to or larger than a threshold angle, the second image at the display unit.

In the above display device, a configuration may be adopted in which, a third detector configured to detect a distance to and from the specific object, and a third adjustment unit configured to adjust, based on a detection result of the third detector, a display position in a front-back direction of the first image, and the display control unit displays, based on an adjustment result of the third adjustment unit, the first image on the display unit.

Another aspect for solving the above problem is a control program for a display device mounted at a head of a user, and including a display unit located at at least one of a left eye side and a right eye side of the user, and displaying a first image that is overlapped on an outside scene, and a computer, wherein the computer is caused to function as a first detector configured to detect an inclination of the head, a first adjustment unit configured to adjust, based on a detection result of the first detector, a display region of the first image, and a display control unit configured to cause, based on an adjustment result of the first adjustment unit, the first image to be displayed in the display region.

Still another aspect for solving the above problem is a control method for a display device mounted at a head of a user, and including a display unit located at at least one of a left eye side and a right eye side of the user, and displaying a first image that is overlapped on an outside scene, and a computer, and the control method includes a detection step of detecting by the computer an inclination of the head, an adjustment step of adjusting, based on a detection result in the detection step, a display region of the first image, and a display control step of causing, based on an adjustment result in the adjustment step, the first image to be displayed in the display region.

Yet another aspect for solving the above problem is a display system including a display device mounted at a head of a user, and an information processing device coupled to the display device, wherein the display device includes a display unit located at at least one of a left eye side and a right eye side of the user, and displaying a first image that is overlapped on an outside scene, the information processing device includes a first detector configured to detect an inclination of the head, a first adjustment unit configured to adjust, based on a detection result in the first detector, a display region of the first image, and a display control unit configured to cause, based on an adjustment result in the first adjustment unit, the first image to be displayed in the display region.

DESCRIPTION OF EXEMPLARY EMBODIMENTS

Exemplary embodiments are described below with reference to the accompanying drawings.

1. Configuration of Display System 1-1. Overall Configuration of Display System

Figure 1:
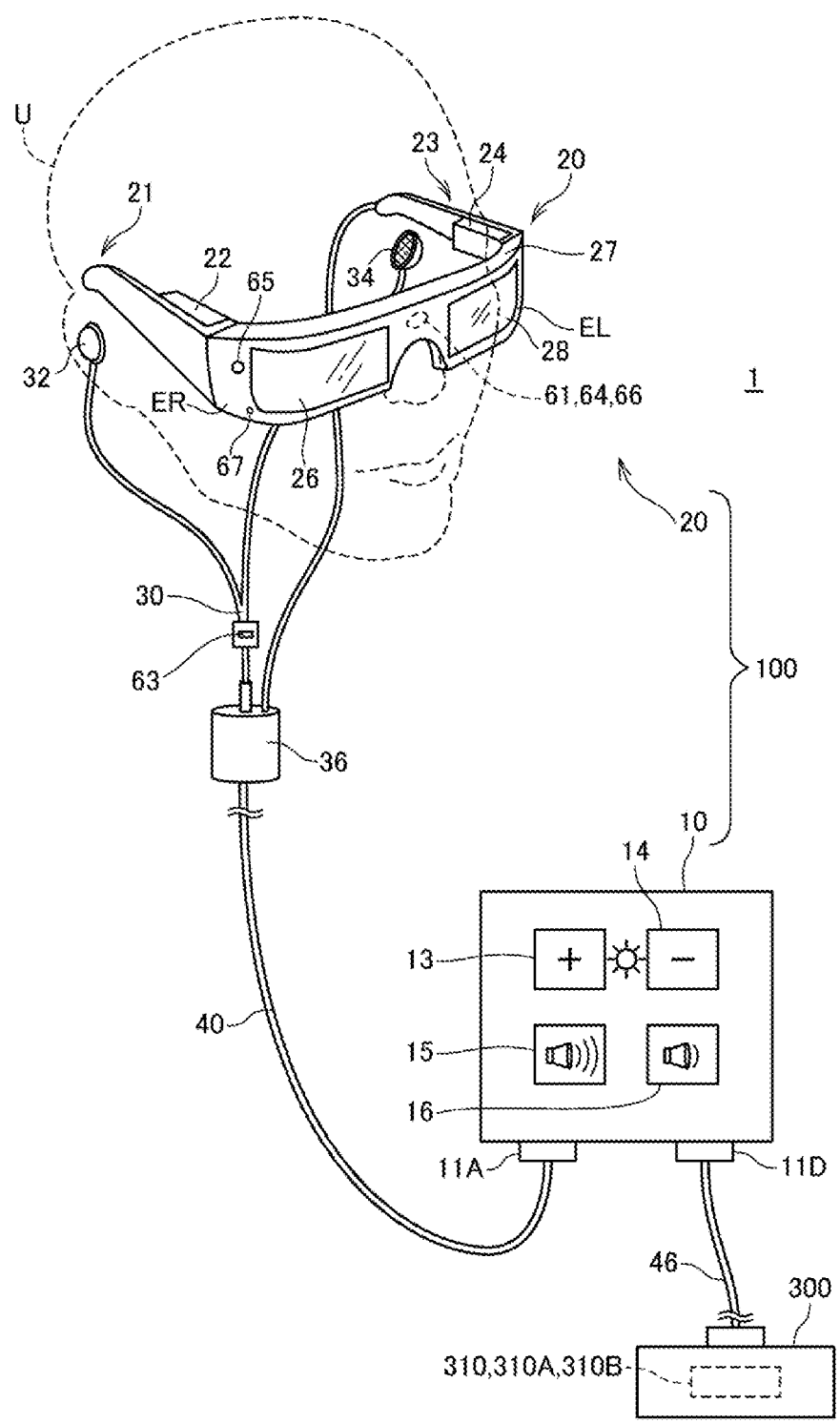
FIG. 1 is a diagram illustrating an example of a configuration of a display system according to the present exemplary embodiment.

FIG. 1 is a diagram illustrating a schematic configuration of a display system 1 according to the present exemplary embodiment.

As illustrated in FIG. 1, the display system 1 includes a Head Mounted Display (HMD) 100. The HMD 100 is a device including an image display unit 20 mounted on a head of a user U, and a connection device 10, and is a device for causing a virtual image to be visually recognized by the user U while the image display unit 20 is mounted on the head of the user U, by the image display unit 20.

The HMD 100 corresponds to an example of a "display device".

In the following description, the user U refers to a user who wears and uses the HMD 100.

The connection device 10 includes a conductive connector 11A and a conductive connector 11D in a box shaped case. The image display unit 20 is coupled to the conductive connector 11A via a coupling cable 40. Hereinafter, when the conductive connectors 11A and 11D are not distinguished, the conductive connectors are referred to as conductive connectors 11 in some cases. The case of the connection device 10 can be referred to as a housing or a main body.

The display system 1 is a system configured by coupling a smart phone 300 to the HMD 100. The conductive connector 11D is an interface to which the smart phone 300 in the HMD 100 is coupled. In other words, in the present exemplary embodiment, the smart phone 300 is coupled to the conductive connector 11D. The smart phone 300 corresponds to an example of an "information processing device".

The smart phone 300 includes a second control unit 310. The second control unit 310 includes a second processor 310A such as a CPU or a microcomputer, and this second processor 310A is configured to execute a second control program to control each component of the smart phone 300. The second control unit 310 includes a read only memory (ROM) configured to store in a non-volatile manner the second control program executed by the second processor 310A and a second memory 310B such as a random access memory (RAM) constituting a work area of the second processor 310A.

In the present exemplary embodiment, the second control unit 310 outputs information indicating a first image P1 to the connection device 10.

Note that, the smart phone 300 is only an example of the information processing device. It is sufficient that the information processing device is portable by the user U, and includes a computer. For example, as the information processing device, a PDA (Personal Digital Assistant) terminal, a tablet personal computer, or the like can be coupled to the connection device 10.

The conductive connectors 11 are wired interfaces to be coupled to a communication cable, and the connection device 10 is coupled to an external device via the communication cable. The conductive connector 11A includes a terminal configured to couple the coupling cable 40, and an interface circuit configured to transmit and receive a signal via the conductive connector 11A.

The conductive connector 11A is provided to couple the image display unit 20 to the connection device 10. The coupling cable 40 is configured to supply power from the connection device 10 to the image display unit 20, and the image display unit 20 and the connection device 10 transmit and receive data to and from each other.

The conductive connector 11D includes an interface circuit input with image data from the smart phone 300, and also capable of outputting sensor data to the smart phone 300. The conductive connector 11D is a conductive connector conforming to a known communication interface standard. In the present exemplary embodiment, as an example, the conductive connector 11D includes an interface circuit supporting input/output of image data and various types of data, and is coupled to a smart phone 300 via a USB cable 46.

For example, a conductive connector of a Universal Serial Bus (USB)-Type C standard can be adopted as the conductive connector 11D. An interface circuit supporting the USB-Type C is capable of transmitting data according to a USB 3.1 standard and supplying a direct-current power within 20 volts and 5 amperes.

Additionally, image data conforming to the High Definition Multimedia Interface (registered trade mark: HDMI) standard, image data conforming to a Mobile High-definition Link (MHL) standard, and the like can be transmitted. The smart phone 300 can provide power supply, transmission and reception of data, and supply of streaming data for images and audio via the USB cable 46. An alternative mode of USB-Type C is known as Alternative mode.

The image display unit 20 overlaps and displays the first image P1 on an outside scene. The image display unit 20 has an eyeglasses-like shape in the present exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28.

The image display unit 20 corresponds to an example of a "display unit".

The right holding part 21 and the left holding part 23 extend rearward from corresponding ends of the front frame 27, to hold the image display unit 20 on the head of the user U. One of the ends of the front frame 27, which lies on the right side of the head when the image display unit 20 is worn, is referred to as an end ER, while the other one of the ends, which lies on the left side, is referred to as an end EL. The right holding part 21 extends from the end ER of the front frame 27 to a position corresponding to the right side of the head of the user U in a state where the user wears the image display unit 20. The left holding part 23 extends from the end EL to a position corresponding to the left side of the head of the user U in a state where the user U wears the image display unit 20.

The right light-guiding plate 26 and the left light-guiding plate 28 are provided on the front frame 27. The right light-guiding plate 26 is located in front of the right eye of the user U in a state where the user U wears the image display unit 20, and causes the user to visually recognize an image with the right eye. The left light-guiding plate 28 is located in front of the left eye of the user U in a state where the user U wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user U in a state where the user U wears the image display unit 20.

The front frame 27 may include a nose pad provided in the coupling position of the right light-guiding plate 26 and the left light-guiding plate 28, and configured to abut on a nose of the user U in a state where the user U wears the image display unit 20. In this case, the image display unit 20 can be held to the head of the user U by the nose pad, the right holding part 21, and the left holding part 23. A belt may also be attached to the right holding part 21 and the left holding part 23 that fits to the back of the head of the user U when the user U wears the image display unit 20. In this case, the belt allows the image display unit 20 to be held on the head of the user U.

Each of the right display unit 22 and the left display unit 24 is a module obtained by unitizing an optical unit and a peripheral circuit.

The right display unit 22 is a unit related to display of an image by the right light-guiding plate 26, and is provided on the right holding part 21 and is located near the right side head part of the user U in the mounted state. The left display unit 24 is a unit related to image display by the left light-guiding plate 28, and is provided on the left holding part 23 and is located near the left side head part of the user U in the mounted state. Note that, the right display unit 22 and the left display unit 24 may be collectively and simply referred to as a "display driving unit".

The right light-guiding plate 26 and the left light-guiding plate 28 are optical members formed of a light transmissive resin or the like, and are configured to guide imaging light output by the right display unit 22 and the left display unit 24 to the eyes of the user U. The right light-guiding plate 26 and the left light-guiding plate 28 are, for example, prisms.

Imaging light guided by the right light-guiding plate 26 and outside light transmitted through the right light-guiding plate 26 are incident on the right eye of the user U. Similarly, the imaging light guided by the left light-guiding plate 28 and the outside light transmitted through the left light-guiding plate 28 are incident on the left eye.

The imaging light guided by the left light-guiding plate 28 corresponds to a first image P1. In other words, the left display unit 24 and the left light-guiding plate 28 overlap and display the first image P1 on the outside scene. The imaging light guided by the right light-guiding plate 26 corresponds to the first image P1. In other words, the right display unit 22 and the right light-guiding plate 26 overlap and display the first image P1 on the outside scene.

The first image P1 will be described in detail below with reference to FIG. 8.

An illuminance sensor 65 is arranged on the front frame 27 of the image display unit 20. The illuminance sensor 65 is configured to receive outside light coming from in front of the user U wearing the image display unit 20.

A camera 61 is disposed on the front frame 27 of the image display unit 20. The camera 61 is provided at a position that the outside light passing through the right light-guiding plate 26 and the left light-guiding plate 28 is not blocked. In the example illustrated in FIG. 1, the camera 61 is disposed at a coupling portion between the right light-guiding plate 26 and the left light-guiding plate 28, but may also be disposed on a side of the end ER of the front frame 27, or may be disposed on a side of the end EL.

The camera 61 corresponds to an example of an "imaging unit".

The camera 61 is a digital camera equipped with an imaging element, such as a charge coupled device (CCD) or a complementary metal-oxide-semiconductor (CMOS), and imaging lens and the like. The camera 61 captures the first imaging range of the outside scene and generates a first captured image.

The first imaging range will be described below with reference to FIG. 7. The camera 61 according to the exemplary embodiment is a monocular camera, but may be a stereo camera.

A Light Emitting Diode (LED) indicator 67 is disposed on the front frame 27. The LED indicator 67 is disposed at the end ER and is configured to light up while the camera 61 is operating to notify that the capturing is in progress.

A distance sensor 64 and an infrared sensor 66 are provided on the front frame 27. The distance sensor 64 is configured to detect a distance to a target object to be measured located in a preset measurement direction. The distance sensor 64 may be a light reflecting type distance sensor including a light source, such as an LED or a laser diode, and a light-receiving unit configured to receive the reflected light that the light emitted by the light source is reflected by the target object to be measured, for example. Further, the distance sensor 64 may be an ultrasonic wave type distance sensor including a sound source configured to generate ultrasonic waves, and a detector configured to receive the ultrasonic waves reflected by the target object to be measured. The distance sensor 64 may be a laser range scanner. In this case, a wider region including an area in front of the image display unit 20 can be scanned.

The infrared sensor 66 detects an infrared ray. For example, the infrared sensor 66 detects an infrared ray exited from an infrared communication unit of the smart phone 300. Furthermore, the infrared sensor 66 may be configured as a part of the infrared communication unit. In this case, communication with the infrared communication unit of the smart phone 300 is possible. The infrared communication unit performs communication based on IrDA standards, for example.

Each of the right display unit 22 and the left display unit 24 of the image display unit 20 is coupled with the connection device 10. In the HMD 100, the coupling cable 40 is coupled with the left holding part 23, and wiring coupled with this coupling cable 40 is laid inside the image display unit 20 to couple each of the right display unit 22 and the left display unit 24 with the connection device 10.

The coupling cable 40 includes an audio connector 36, wherein a headset 30 including a right earphone 32 and a left earphone 34 constituting a stereo headphone, and a microphone 63, is coupled to the audio connector 36. The right earphone 32 is to be worn on a right ear of the user U, while the left earphone 34 is to be worn on a left ear of the user U. The right earphone 32 and the left earphone 34 can also be referred to as a sound output unit.

The right earphone 32 and the left earphone 34 output a sound based on a sound signal output from the connection device 10.

The microphone 63 is configured to collect a sound and outputs the sound signal to the connection device 10. The microphone 63 may be, for example, a monaural microphone or a stereo microphone, or may be a directional microphone or a non-directional microphone.

The connection device 10 includes a brightness adjusting key 13, a brightness adjusting key 14, a sound volume adjusting key 15, and a sound volume adjusting key 16 as operated parts to be operated by the user U. Each of the brightness adjustment key 13, the brightness adjustment key 14, the volume adjustment key 15, and the volume adjustment key 16 is composed of a hardware key. These operated parts are disposed on the surface of the main body of the connection device 10, and may be operated by fingers of the user U, for example.

The brightness adjustment keys 13, 14 are hardware keys for adjusting display luminance of an image displayed by the image display unit 20. The brightness adjusting key 13 is configured to instruct an increase in brightness, and the brightness adjusting key 14 is configured to instruct a reduction in brightness. The volume adjusting keys 15, 16 are hardware keys configured to adjust volume of sound output from the right earphone 32 and the left earphone 34. The volume adjusting key 15 is configured to instruct an increase in volume, and the sound volume adjusting key 16 is configured to instruct a reduction in volume.

In the present exemplary embodiment, the HMD 100 includes the right light-guiding plate 26 and the left light-guiding plate 28, but exemplary embodiments of the present disclosure are not limited thereto. It is sufficient that the HMD 100 is located on at least one of a left eye side and a right eye side of the user U, and overlaps and displays the first image P1 on the outside scene. That is, it is sufficient that the HMD 100 includes at least one of right light-guiding plate 26 and left light-guiding plate 28. For example, it is possible that the HMD 100 includes the right light-guiding plate 26 and does not include the left light-guiding plate 28. Further, for example, it is also possible that the HMD 100 includes the left light-guiding plate 28 and does not include the right light-guiding plate 26.

1-2. Configuration of Optical System of Image Display Unit of HMD

Figure 2:
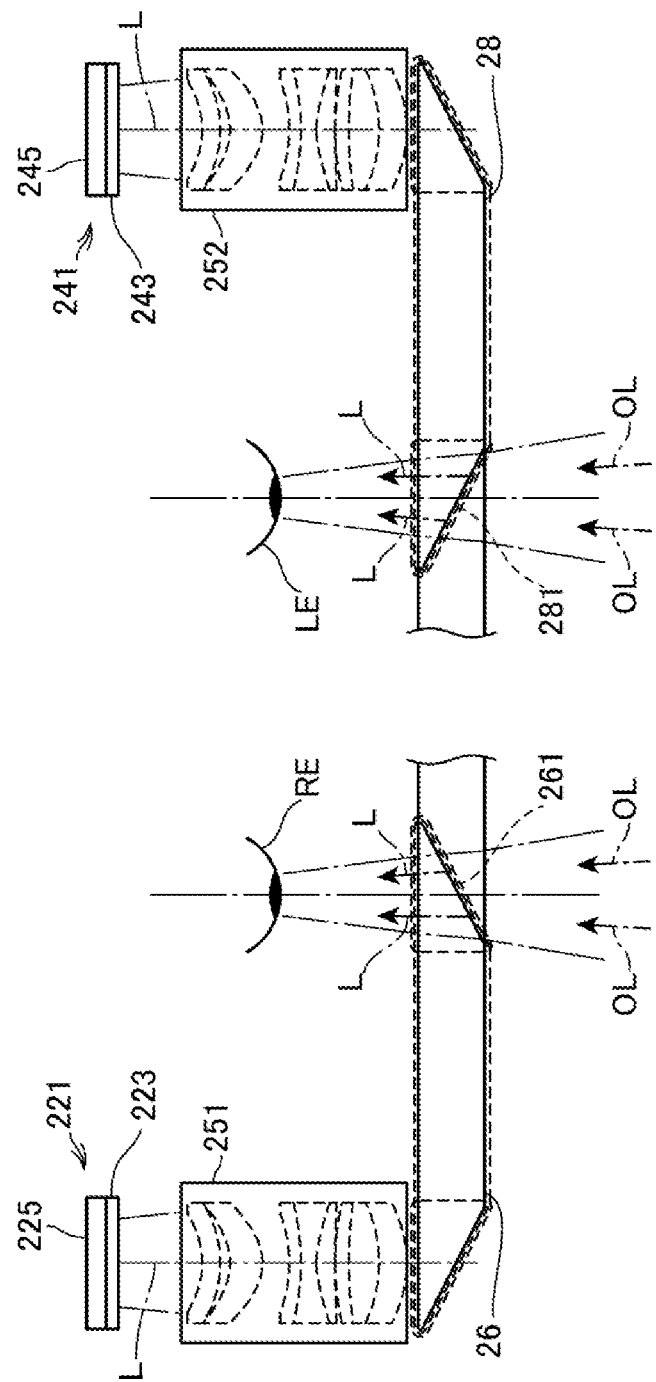
FIG. 2 is a diagram illustrating an example of a configuration of an optical system of an image display unit.

FIG. 2 is a plan view illustrating a main part of a configuration of an optical system included in the image display unit 20. In FIG. 2, a left eye LE and a right eye RE of the user U are illustrated for explanation.

As illustrated in FIG. 2, the right display unit 22 and the left display unit 24 are configured symmetrically. As a configuration where the right eye RE of the user U is caused to visually recognize an image, the right display unit 22 includes an Organic Light-Emitting Diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED driving circuit 225 configured to drive the OLED panel 223. The OLED panel 223 is a self-light emission type display panel including light-emitting elements disposed in a matrix and configured to emit light by organic electroluminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix. The OLED driving circuit 225 is controlled by a first control unit 120 to select and power the light-emitting elements included in the OLED panel 223 to cause the light-emitting elements of the OLED panel 223 to emit light. The first control unit 120 will be described below with reference to FIG. 4 and FIG. 5.

Figure 4:
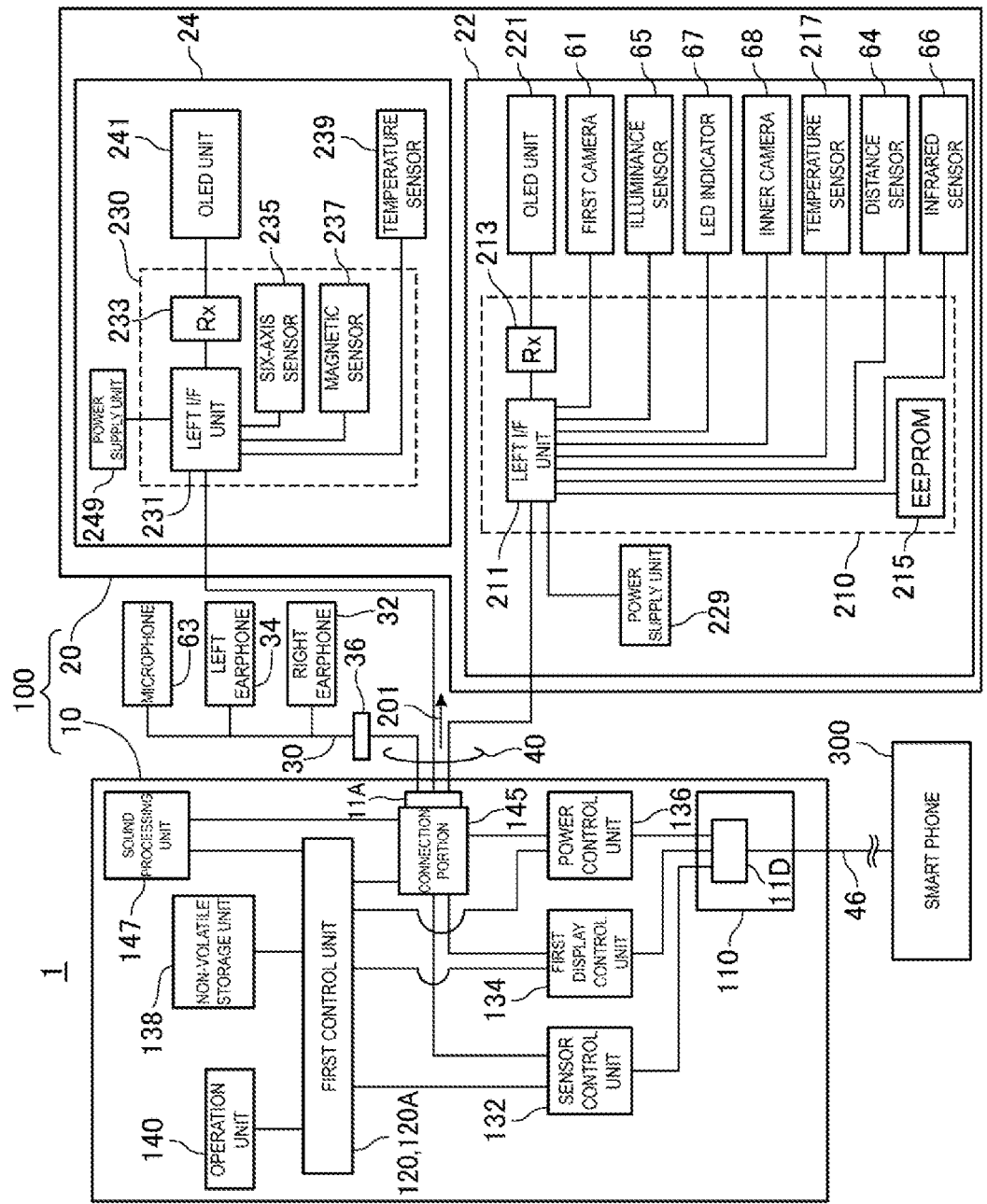
FIG. 4 is a diagram illustrating an example of a configuration of respective components configuring an HMD.

The OLED driving circuit 225 is fixed by bonding or the like to a rear face of the OLED panel 223, namely, a back side of a light-emitting surface of the OLED panel 223. The OLED driving circuit 225 may include, for example, a semiconductor device configured to drive the OLED panel 223, and may be mounted on a substrate (not illustrated)

fixed to the rear face of the OLED panel 223. A temperature sensor 217 illustrated in FIG. 4 is mounted on this substrate.

Note that the OLED panel 223 may include a configuration in which light-emitting elements configured to emit white color light are disposed in a matrix, and color filters corresponding to the R color, the G color, and the B color respectively are disposed to be superimposed on the light-emitting elements. Additionally, the OLED panel 223 of a WRGB configuration including light-emitting elements configured to emit white (W) color light may be used, in addition to the light-emitting elements configured to emit the R color light, the G color light, and the B color light respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L are formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image at a retina of the right eye RE, and causes the user U to visually recognize the first image P1.

Additionally, as a configuration in which the left eye LE of the user U is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED driving circuit 245 configured to drive the OLED panel 243. The OLED panel 243 is a self-light emission type display panel configured in a manner similar to the OLED panel 223. The OLED driving circuit 245 is instructed by the first control unit 120 to select and power the light-emitting elements included in the OLED panel 243 to cause the light-emitting elements of the OLED panel 243 to emit light.

The OLED driving circuit 245 is fixed by bonding or the like to a rear face of the OLED panel 243, namely, a back side of a light-emitting surface of the OLED panel 243. The OLED driving circuit 245 may include, for example, a semiconductor device configured to drive the OLED panel 243, and may be mounted on a substrate (not illustrated) fixed to the rear face of the OLED panel 243. A temperature sensor 239 illustrated in FIG. 4 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L are formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina at the left eye LE, and causes the user U to visually recognize the first image P1.

According to the configuration, the HMD 100 serves as a transmissive display device. Namely, the imaging light L reflected by the half mirror 261 and outside light OL having passed through the right light-guiding plate 26 enter the right eye RE of the user U. Additionally, the imaging light L reflected by the half mirror 281 and the outside light OL having passed through the half mirror 281 enter the left eye LE. As described above, the HMD 100 allows the imaging light L of the image processed internally and the outside light OL to enter the eyes of the user U in an overlapped manner, and the user U can see the outside scene through the right light-guiding plate 26 and the left light-guiding plate 28, and can view the image based on the imaging light L overlapping with the outside scene.

The half mirrors 261 and 281 are image extracting units configured to reflect the imaging light output by the right display unit 22 and the left display unit 24 respectively to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user U. For example, a diffraction grating may be used, or a semi-transmissive reflection film may be used.

Figure 3:
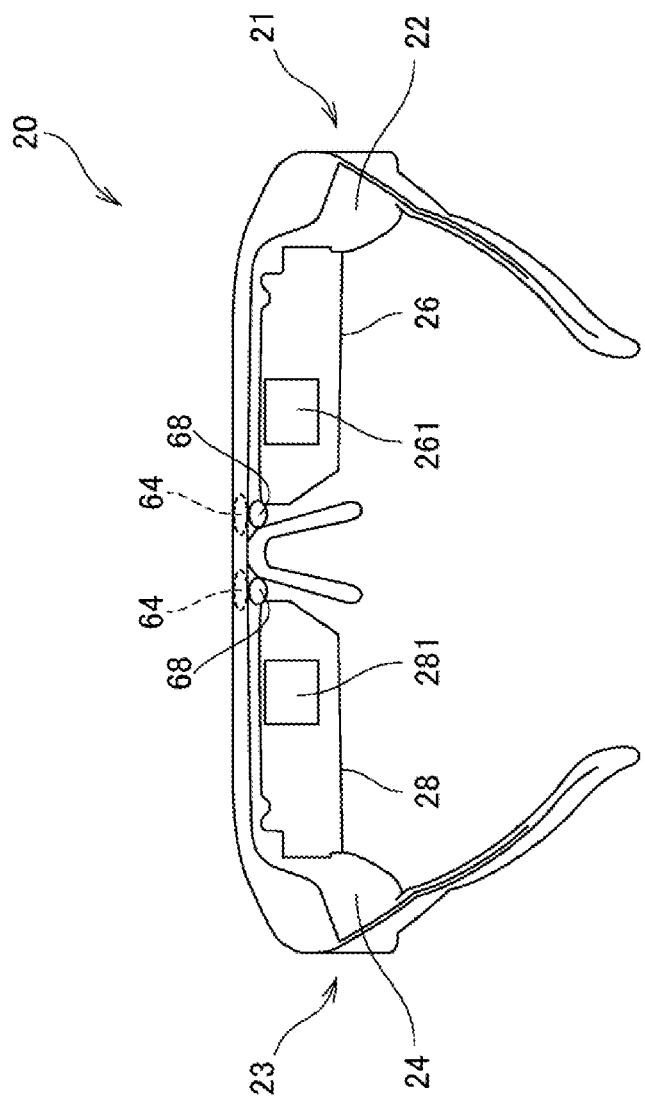
FIG. 3 is a perspective view illustrating an example of a configuration of a main part of the image display unit.

FIG. 3 is a diagram illustrating a configuration of a main part of the image display unit 20. FIG. 3 is a perspective view of the main part of the image display unit 20 seen from a head side of the user U. Note that, in FIG. 3, illustration of the coupling cable 40 is omitted.

FIG. 3 illustrates a side contacting the head of the user U of the image display unit 20, that is, a side seen from the right eye RE and the left eye LE of the user U. In other words, in FIG. 3, back sides of the right light-guiding plate 26 and the left light-guiding plate 28 are visible.

In FIG. 3, the half mirror 261 configured to irradiate the right eye RE of the user U with imaging light and the half mirror 281 configured to irradiate the left eye LE with imaging light are visible as approximately square-shaped regions. Additionally, all the right light-guiding plate 26 including the half mirror 261 and the left light-guiding plate 28 including the half mirror 281 transmit the outside light as described above. Thus, the user U visually recognizes an outside scene through all the right light-guiding plate 26 and the left light-guiding plate 28, and visually recognizes rectangular display images at positions of the half mirrors 261 and 281.

Additionally, inner cameras 68 are disposed on the user U side of the image display unit 20. A pair of inner cameras 68 are provided in a central position between the right light-guiding plate 26 and the left light-guiding plate 28 so as to correspond respectively to the right eye RE and the left eye LE of the user U. The inner cameras 68 are a pair of cameras that respectively capture an image of the right eye RE and the left eye LE of the user U. The inner cameras 68 captures an image in accordance with instructions from the first control unit 120. The first control unit 120 analyzes the imaging data of the inner cameras 68. For example, the first control unit 120 detects an image of the reflected light and the pupil on the surface of the eyeball of the right eye RE and the left eye LE from the imaging data of the inner camera 68, and determines the sight line direction of the user U. The first control unit 120 may determine the change in the sight line direction of the user U and may detect the eyeball movement of each of the right eye RE and the left eye LE.

Here, the movement of the user U's line of sight can also be seen as movement of the user U's virtual viewpoint.

When detecting the sight line direction of the right eye RE and the left eye LE from the captured image of the inner camera(s) 68, the first control unit 120 can determine the convergence angle of the right eye RE and the left eye LE. The convergence angle corresponds to a distance to the object the user U fixates on. That is, when the user U sterically views an image and an object, the convergence angle of the right eye RE and the left eye LE is determined in accordance with the distance to the object to be viewed. Accordingly, the convergence angle can be detected to evaluate a distance from where the user U fixates on. Further, when an image is displayed so to guide the convergence angle of the user U, a stereoscopic view can be induced.

In addition, in accordance with an instruction from the second control unit 310, based on an adjustment result in an adjustment unit 315, the first control unit 120 causes the image display unit 20 to display the first image P1.

1-3. Configuration of Respective Components of HMD

FIG. 4 is a diagram illustrating an example of a configuration of respective components configuring the HMD 100.

The right display unit 22 of the image display unit 20 includes a right display unit substrate 210. On the right display unit substrate 210, a right I/F unit 211 coupled to the coupling cable 40, a reception unit 213 that receives data input from the connection device 10 via the right I/F unit 211, and an Electrically Erasable Programmable Read Only Memory (EEPROM) 215 are mounted. The right I/F unit 211 couples the reception unit 213, the EEPROM 215, the temperature sensor 217, the camera 61, the distance sensor 64, the illuminance sensor 65, the infrared sensor 66, the LED indicator 67, and the inner camera 68 to the connection device 10. The reception unit 213 couples the OLED unit 221 to the connection device 10.

The left display unit 24 includes a left display unit substrate 230. On the left display unit substrate 230, a left I/F unit 231 coupled to the coupling cable 40, a reception unit 233 that receives data input from the connection device 10 via the left I/F unit 231 are mounted. Further, the left display unit substrate 230 is mounted with a six-axis sensor 235 and a magnetic sensor 237.

The left I/F unit 231 couples the reception unit 233, the six-axis sensor 235, the magnetic sensor 237, and the temperature sensor 239 to the connection device 10. The reception unit 233 couples an OLED unit 241 to the connection device 10.

I/F is an abbreviation for interface. Note that, in the present exemplary embodiment, the reception unit 213 and the reception unit 233 may be referred to as Rx213 and Rx233, respectively.

The EEPROM 215 is configured to store various types of data in a non-volatile manner. The EEPROM 215 stores, for example, data about light-emitting properties and display properties of the OLED units 221 and 241 provided in the image display unit 20, and data about a property of a sensor provided in the right display unit 22 or the left display unit 24.

Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100, and are written into the EEPROM 215. The data stored in the EEPROM 215 can be read by the first control unit 120.

The camera 61 captures an image in accordance with a signal input via the right I/F unit 211 and outputs imaging data to the right I/F unit 211.

The illuminance sensor 65 is configured to receive the outside light and output a detection value corresponding to an amount of the received light or an intensity of the received light. The LED indicator 67 is configured to light up in accordance with a control signal or a driving current input via the right I/F unit 211.

The inner camera 68 captures an image in accordance with a signal input via the right I/F unit 211 and outputs imaging data to the right I/F unit 211.

The temperature sensor 217 is configured to detect a temperature of the OLED unit 221, and outputs a voltage value or a resistance value corresponding to the detected temperature as a detection value.

The distance sensor 64 is configured to execute distance detection, and output a signal indicating detection results to the connection device 10 via the right I/F unit 211. As the distance sensor 64, for example, an infrared ray type depth sensor, an ultrasonic type distance sensor, a Time Of Flight distance sensor, a distance detecting unit configured to combine image detection and sound detection, or the like can be used. Additionally, the distance sensor 64 may be configured to process an image obtained by stereo photographing by a stereo camera or a monocular camera to detect a distance.

The infrared sensor 66 is configured to execute infrared detection, and output a signal indicating detection results to the connection device 10 via the right I/F unit 211.

The reception unit 213 is configured to receive image data for displaying transmitted from the connection device 10 via the right I/F unit 211, and output the image data to the OLED unit 221. The OLED unit 221 displays an image based on the image data transmitted by the connection device 10.

The reception unit 233 is configured to receive image data for displaying transmitted from the connection device 10 via the left I/F unit 231, and output the image data to the OLED unit 241. The OLED unit 221, 241 display an image based on the image data transmitted by the connection device 10.

The six-axis sensor 235 is a motion sensor including a three-axis acceleration sensor and a three-axis gyro sensor. As the six-axis sensor 235, an Inertial Measurement Unit (IMU) including the above-described sensors as modules may be adopted. The magnetic sensor 237 is a three-axis geomagnetic sensor, for example. A gyro sensor is also referred to as an angular velocity sensor.

The temperature sensor 239 is configured to detect a temperature of the OLED unit 241, and output a voltage value or a resistance value corresponding to the detected temperature as a detection value.

Each component of the image display unit 20 operates with power supplied from the connection device 10 via the coupling cable 40.

The image display unit 20 includes a power supply unit 229 on the right display unit 22, and a power supply unit 249 on the left display unit 24. The power supply unit 229 is configured to distribute and supply the power supplied by the connection device 10 via the coupling cable 40 to each part of the right display unit 22 including the right display unit substrate 210. Similarly, the power supply unit 249 is configured to distribute and supply the power supplied by the connection device 10 via the coupling cable 40 to each part of the left display unit 24 including the left display unit substrate 230. The right display unit 22 and the left display unit 24 may include a conversion circuit or the like configured to convert a voltage.

The connection device 10 includes an I/F unit 110, the first control unit 120, a sensor control unit 132, a first display control unit 134, a power control unit 136, a non-volatile storage unit 138, an operation unit 140, a connection portion 145, and a sound processing unit 147.

The I/F unit 110 includes the conductive connector 11D. Further, the I/F unit 110 includes interface circuits coupled to the conductive connector 11D and configured to execute communication protocols conforming to respective communication standards.

The I/F unit 110 may be, for example, an interface substrate on which the conductive connector 11D and the interface circuit are mounted. Further, a configuration may be adopted in which the first control unit 120, the sensor control unit 132, the first display control unit 134, and the power control unit 136 of the connection device 10 are mounted on a connection device main substrate (not illustrated). In this case, on the connection device main substrate, the conductive connector 11D of the I/F unit 110 and the interface circuit may be mounted.

Additionally, the I/F unit 110 may include, for example, an interface circuit for a memory card capable of being coupled to an external storage medium, or the like, or the I/F unit 110 may be configured by a wireless communication interface circuit.

The first control unit 120 is configured to control each part of the connection device 10. The first control unit 120 includes a first processor 120A such as a Central Processing Unit (CPU), for example. In the first control unit 120, the first processor 120A executes a first control program to control each component of the HMD 100 in cooperation of software and hardware. The first control unit 120 is coupled to the non-volatile storage unit 138, the operation unit 140, the connection portion 145, and the sound processing unit 147.

The sensor control unit 132 is configured to control the camera 61, the distance sensor 64, the illuminance sensor 65, the infrared sensor 66, the temperature sensor 217, the six-axis sensor 235, the magnetic sensor 237, and the temperature sensor 239. Specifically, the sensor control unit 132 is configured to perform setting and initialization of a sampling period of each sensor according to control of the first control unit 120, and execute energization to each sensor, transmission of control data, acquisition of detection values and the like, in correspondence to the sampling period of each sensor.

The sensor control unit 132 is coupled to the conductive connector 11D of the I/F unit 110, and is configured to output the data regarding the detection value acquired from each sensor to the conductive connector 11D at a preset timing. The smart phone 300 coupled to the conductive connector 11D can acquire the detection value of each sensor of the HMD 100, the imaging data of the camera 61, and data indicating a line-of-sight direction detected by the inner camera 68.

The first display control unit 134 is configured to execute various kinds of processing for the image display unit 20 to display an image based on image data input to the I/F unit 110. In the present exemplary embodiment, an image signal output by the smart phone 300 is input to the conductive connector 11D. The image signal is digital image data, but may be an analog image signal.

For example, the first display control unit 134 is configured to execute various kinds of processing such as cutting out of a frame, resolution conversion, intermediate frame generation, and frame rate conversion. Resolution conversion includes so-called scaling. The first display control unit 134 is configured to output image data corresponding to each of the OLED unit 221, and the OLED unit 241 to the connection portion 145. The image data input to the connection portion 145 is transmitted from the conductive connector 11A to the right I/F unit 211 and the left I/F unit 231 as an image signal 201. The image signal 201 is digital image data processed in response to each of the OLED unit 221 and the OLED unit 241.

In the present exemplary embodiment, the conductive connector 11D is configured by a USB-Type C conductive connector. The first display control unit 134 receives image data transmitted in USB-Type C alternative mode via the conductive connector 11D.

The sensor control unit 132 and/or the first display control unit 134 may be realized by cooperation of software and hardware by the first processor 120A executing the first control program. That is, the sensor control unit 132 and the first display control unit 134 are configured by the first processor 120A to execute the control program to execute the operations described above. In this example, the sensor control unit 132 and the first display control unit 134 may be realized by the first processor 120A constituting the first control unit 120 executing the first control program. In other words, the first processor may function as the first control unit 120, the first display control unit 134 and the sensor control unit 132 by executing the first control program.

Additionally, each of the first display control unit 134 and the sensor control unit 132 may include programmed hardware such as a Digital Signal Processor (DSP) and a Field Programmable Gate Array (FPGA). Additionally, the sensor control unit 132 and the first display control unit 134 may be integrated to be constituted as a System-on-a-Chip (SoC)-FPGA.

The power control unit 136 is coupled to the conductive connector 11D. The power control unit 136 is configured to, based on power supplied from the conductive connector 11D, supply power to each component of the connection device 10 and to the image display unit 20. Additionally, the power control unit 136 may include a voltage conversion circuit (not illustrated) built in, and may be configured to be capable of supplying different voltage to each component of the connection device 10 and the image display unit 20. The power control unit 136 may be configured of a programmed semiconductor device such as a logic circuit and the FPGA. Further, the power control unit 136 may be configured of hardware common to the sensor control unit 132 and/or the first display control unit 134.

Each of the sensor control unit 132, the first display control unit 134, and the power control unit 136 may include a work memory for executing data processing, and may execute processing by using the memory of the first control unit 120.

The operation unit 140 is configured to detect an operation on an operated part included in the connection device 10 and outputs data indicating an operation content or an operation signal indicating the part to be operated to the first control unit 120.

The sound processing unit 147 is configured to generate a sound signal according to sound data that is input from the first control unit 120, and output the sound signal to the connection portion 145. This sound signal is output from the connection portion 145 to the right earphone 32 and the left earphone 34 via the audio connector 36. Additionally, the sound processing unit 147 is configured to adjust the volume of the sound signal under the control of the first control unit 120. Additionally, the sound processing unit 147 is configured to generate sound data of the sound collected by the microphone 63, and output the sound data to the first control unit 120. This voice data may be processed in the same manner as the detected value of the sensor included in the image display unit 20 by the first control unit 120.

Additionally, the connection device 10 may include a rechargeable battery (not illustrated), and may be configured to supply power to each component of the connection device 10 and the image display unit 20 from this battery. The battery included in the connection device 10 may be a rechargeable secondary battery.

1-4. Configuration of First Control Unit

Figure 5:
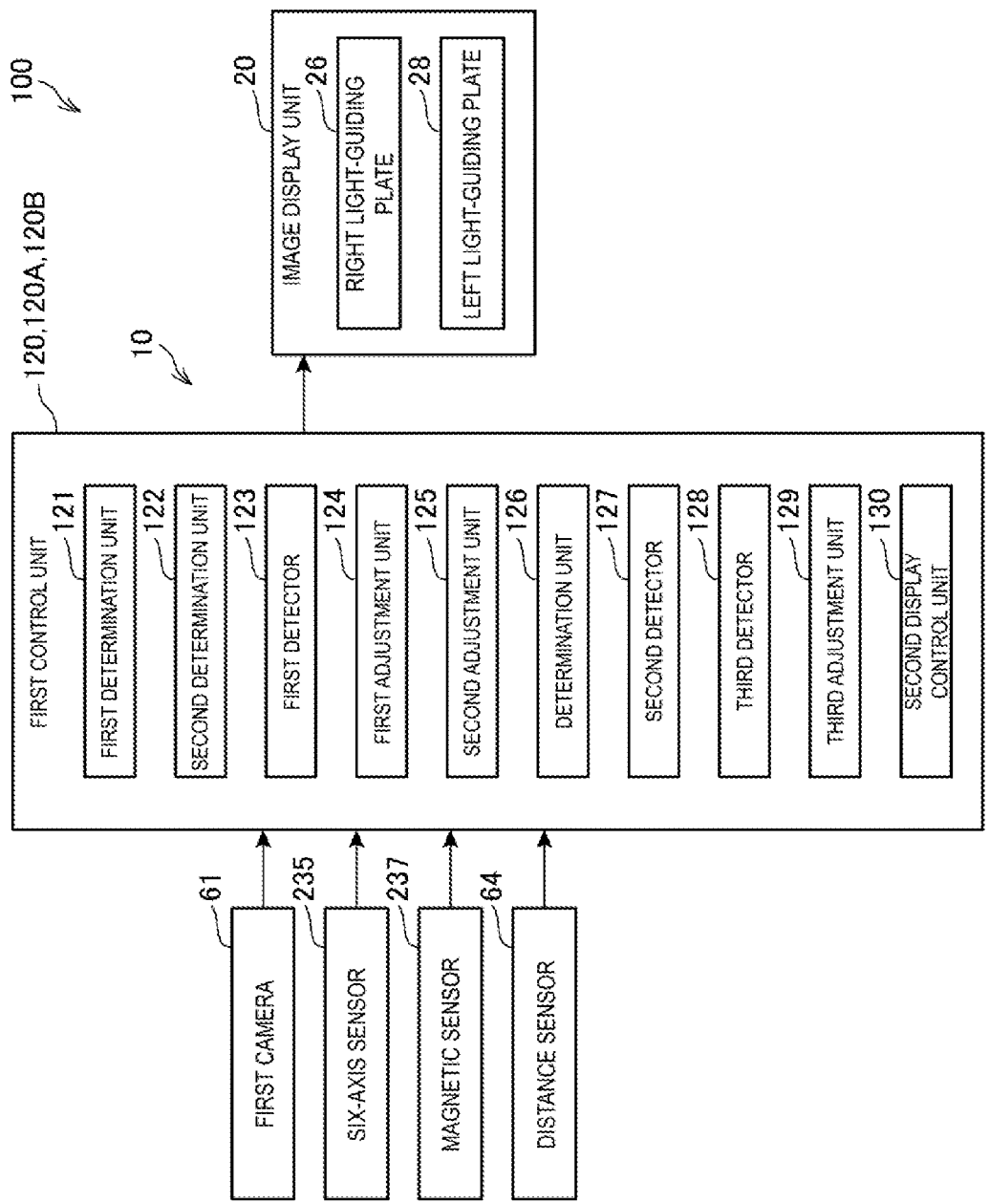
FIG. 5 is a diagram illustrating an example of a configuration of a first control unit.

FIG. 5 is a diagram illustrating an example of a configuration of the first control unit 120.

The first control unit 120 is communicatively coupled to the image display unit 20, the first camera 61, the six-axis sensor 235, and the magnetic sensor 237.

The first control unit 120 includes the first processor 120A, and this first processor 120A executes the first control program to control each component of the connection device 10. The first control unit 120 includes a first memory 120B that stores, in a non-volatile manner, the first control program executed by the first processor 120A.

The first processor 120A corresponds to an example of a "computer". The first control program stored in the first memory 120B of the first control unit 120 corresponds to an example of a "control program".

The first memory 120B may also include, for example, a magnetic recording device such as a Hard Disk Drive (HDD), or a storage device using a semiconductor storage element such as a flash memory.

The first control unit 120 includes a first determination unit 121, a second determination unit 122, a first detector 123, a first adjustment unit 124, a second adjustment unit 125, a determining unit 126, a second detector 127, a third detector 128, a third adjustment unit 129, and a second display control unit 130. Specifically, the first control unit 120, by the first processor 120A included in the first control unit 120 executing the first control program, functions as the first determination unit 121, the second determination unit 122, the first detector 123, the first adjustment unit 124, the second adjustment unit 125, the determining unit 126, the second detector 127, the third detector 128, the third adjustment unit 129, and the second display control unit 130.

The first determination unit 121, based on a captured image captured by the first camera 61, determines a specific object ST. For example, the first determination unit 121, based on an operation by the user U, determines the specific object ST included in an imaging region AR1 captured by the first camera 61. The specific object ST is disposed in a real space. The user U determines the specific object ST by, for example, operating a cross key (not illustrated) disposed on the connection device 10.

The imaging region AR1 and the specific object ST will be described in detail with reference to FIG. 7.

The second determination unit 122, based on a captured image captured by the first camera 61, determines a displayable region ARA. The displayable region ARA indicates a region in which the first image P1 is displayable. The first image P1 is an image displaying a character string TX in the present exemplary embodiment.

For example, the second determination unit 122, based on an operation by the user U, determines the displayable region ARA. The displayable region ARA is included in the imaging region AR1 captured by the first camera 61. The user U, for example, manipulates the cross key (not illustrated) disposed on the connection device 10, to determine the displayable region ARA.

The displayable region ARA will be described in detail below with reference to FIG. 7.

The first detector 123 detects an inclination of the head of the user U. Specifically, the first detector 123 detects an inclination angle θ in the left-right direction of the head of the user U, and an inclination angle η in the front-back direction of the head of the user U. Further, specifically, the first detector 123, based on a detection result in the six-axis sensor 235, detects the inclination angle θ and the inclination angle η.

The inclination angle θ and the inclination angle η will be described in detail below with reference to FIG. 6.

In the present exemplary embodiment, the first detector 123, based on a detection result in the six-axis sensor 235, detects the inclination angle θ and the inclination angle η, but exemplary embodiments of the present disclosure are not limited thereto. The first detector 123 may detect the inclination angle θ and the inclination angle η based on a detection result in the magnetic sensor 237.

In addition, in the present exemplary embodiment, the first detector 123 detects the inclination angle θ and the inclination angle η, but exemplary embodiments of the present disclosure are not limited thereto. It is sufficient that the first detector 123 detects at least one of the inclination angle θ and the inclination angle η.

The first adjustment unit 124, based on a detection result in the first detector 123, adjusts the display region ARP of the first image P1. In other words, the first adjustment unit 124, based on a position of the specific object ST included in a captured image, adjusts the display region ARP of the first image P1. The display region ARP indicates a region for displaying the first image P1.

Specifically, the first adjustment unit 124 virtually fixes the displayable region ARA that indicates a region in which the first image P1 is displayable to the specific object ST, and adjusts the display region ARP to be a region where an image display region AR2 overlaps with the displayable region ARA. The image display region AR2 indicates a region in which the image display unit 20 displays an image. In other words, the first adjustment unit 124 adjusts the image display region ARP to be a region where the displayable region ARA overlaps with the image display region AR2.

For example, a case where the specific object ST is a side of a stage will be described. On the stage, as illustrated in FIG. 7, for example, a performer PY performs an opera. The first adjustment unit 124 sets the specific object ST such that the specific object ST does not overlap with the performer PY on the stage. In addition, the first adjustment unit 124, in accordance with placement of audience seats, that is, distances to and from the stage, angles, and the like, arranges the displayable region ARA. In addition, the first adjustment unit 124, in accordance with the placement of audience seats, arranges the displayable region ARA, to an extent that the user U is able to visually recognize the performer PY on the stage with the HMD 100, that is, in order for performance by the performer PY to be visible, and for the character string TX displaying subtitles illustrated in FIG. 9 to be visible.

The display region ARP, the image display region AR2, and the first adjustment unit 124 will be described in detail with reference to FIG. 7.

The second adjustment unit 125, based on an adjustment result in the first adjustment unit 124, adjusts the number of lines of the character string TX displayed in the display region ARP.

Specific examples of processing of the second adjustment unit 125 will be described in detail with reference to FIG. 9.

The determining unit 126 determines whether an entirety of the first image P1 is displayable in the display region ARP or not.

For example, the determining unit 126 calculates a maximum number of characters NA that is displayable in the display region ARP, and when the number of characters NT of the character string TX corresponding to the first image P1 is equal to or less than the maximum number of characters NA, the determining unit 126 determines that the entirety of the first image P1 is displayable in the display region ARP. Further, when the number of characters NT is larger than the maximum number of characters NA, the determining unit 126 determines that the entirety of the first image P1 is not displayable in the display region ARP.

Since the first adjustment unit 124 adjusts the display region ARP to be the region where the displayable region ARA overlaps with the image display region AR2, a largeness of the image display region AR2 changes, along with a change in at least one of the inclination angle θ and the inclination angle η. When a largeness of the display region ARP decreases, the entirety of the first image P1 is not displayable in some cases.

The second detector 127 detects an orientation in the left-right direction of the head of the user U. Specifically, the second detector 127, based on a detection result in the six-axis sensor 235, detects an angle φ formed by a front direction of the user U and the orientation in the left-right direction of the head.

The angle φ will be described in detail below with reference to FIG. 6.

In the present exemplary embodiment, the second detector 127 detects the angle φ based on a detection result in the six-axis sensor 235, but exemplary embodiments of the present disclosure are not limited thereto. The second detector 127 may detect the angle φ based on a detection result in the magnetic sensor 237.

The third detector 128 detects a distance between the HMD 100 and the specific object ST. Specifically, the third detector 128, based on a detection result in the distance sensor 64, detects the distance between the HMD 100 and the specific object ST.

The third adjustment unit 129, based on the detection result in the third detector 128, adjusts a virtual display position in the front-back direction of the first image P1. Specifically, the third adjustment unit 129 adjusts a convergence angle between the first image P1 displayed on the right light-guiding plate 26 and the first image P1 displayed on the left light-guiding plate 28, to adjust the virtual display position in the front-back direction of the first image P1.

The third adjustment unit 129 adjusts the virtual display position in the front-back direction of the first image P1, for example, to be a position corresponding to the distance between the HMD 100 and the specific object ST. In other words, the third adjustment unit 129, as the distance between the HMD 100 and the specific object ST increases, adjusts the virtual display position of the first image P1 to be a farther position from HMD 100.

Further, the third adjustment unit 129 may match the virtual display position in the front-back direction of the first image P1 with the position of the specific object ST. In this case, the user U can easily and visually recognize the first image P1, and an object located in a vicinity of the specific object ST, for example, the performer PY.

The performer PY will be described below with reference to FIG. 7.

The second display control unit 130, based on an adjustment result in the first adjustment unit 124, causes the first image P1 to be displayed in the display region ARP. Further, the second display control unit 130, based on the number of lines of the character string TX adjusted by the second adjustment unit 125, causes the first image P1 to be displayed in the display region ARP.

Further, when the determining unit 126 determines that the entirety of the first image P1 is not displayable in the display region ARP, the second display control unit 130 causes the first image P1 to be displayed in the display region ARP in a time-division manner.

For example, when the first image P1 is divided into two images of a first small image P11 and a second small image P12, the second display control unit 130 displays the first small image P11 in the display region ARP, and after a predetermined amount of time, displays the second small image P12 in place of the first small image P11. The predetermined amount of time is, for example, one second. The predetermined amount of time is determined, for example, in accordance with an interval of time after which the first image P1 is updated.

Further, the second display control unit 130, based on an adjustment result in the third adjustment unit 129, causes the first image P1 to be displayed in the display region ARP.

Further, the second display control unit 130, based on a detection result in the second detector 127, displays a second image P2 different from the first image P1 in the image display region AR2.

The second image P2 will be described in detail below with reference to FIG. 10.

In the present exemplary embodiment, the first control unit 120 includes the first determination unit 121, the second determination unit 122, the first detector 123, the first adjustment unit 124, the second adjustment unit 125, the determining unit 126, the second detector 127, the third detector 128, the third adjustment unit 129, and the second display control unit 130, but the present disclosure is not limited thereto.

The second control unit 310 of the smart phone 300 may include the first determination unit 121, the second determination unit 122, the first detector 123, the first adjustment unit 124, the second adjustment unit 125, the determining unit 126, the second detector 127, the third detector 128, the third adjustment unit 129, and the second display control unit 130. This embodiment may be described as "another exemplary embodiment of the disclosure".

In addition, the first control unit 120 may include some of the first determination unit 121, the second determination unit 122, the first detector 123, the first adjustment unit 124, the second adjustment unit 125, the determining unit 126, the second detector 127, the third detector 128, the third adjustment unit 129, and the second display control unit 130, and the second control unit 310 of the smart phone 300 may include the rest of the first determination unit 121, the second determination unit 122, the first detector 123, the first adjustment unit 124, the second adjustment unit 125, the determining unit 126, the second detector 127, the third detector 128, the third adjustment unit 129, and the second display control unit 130.

2. Description of Processing of First Control Unit Using Specific Example

Each of FIG. 6 to FIG. 10 is a diagram illustrating a specific example of processing of the first control unit 120.

2-1. Description of Processing of First Detector and Second Detector

Figure 6:
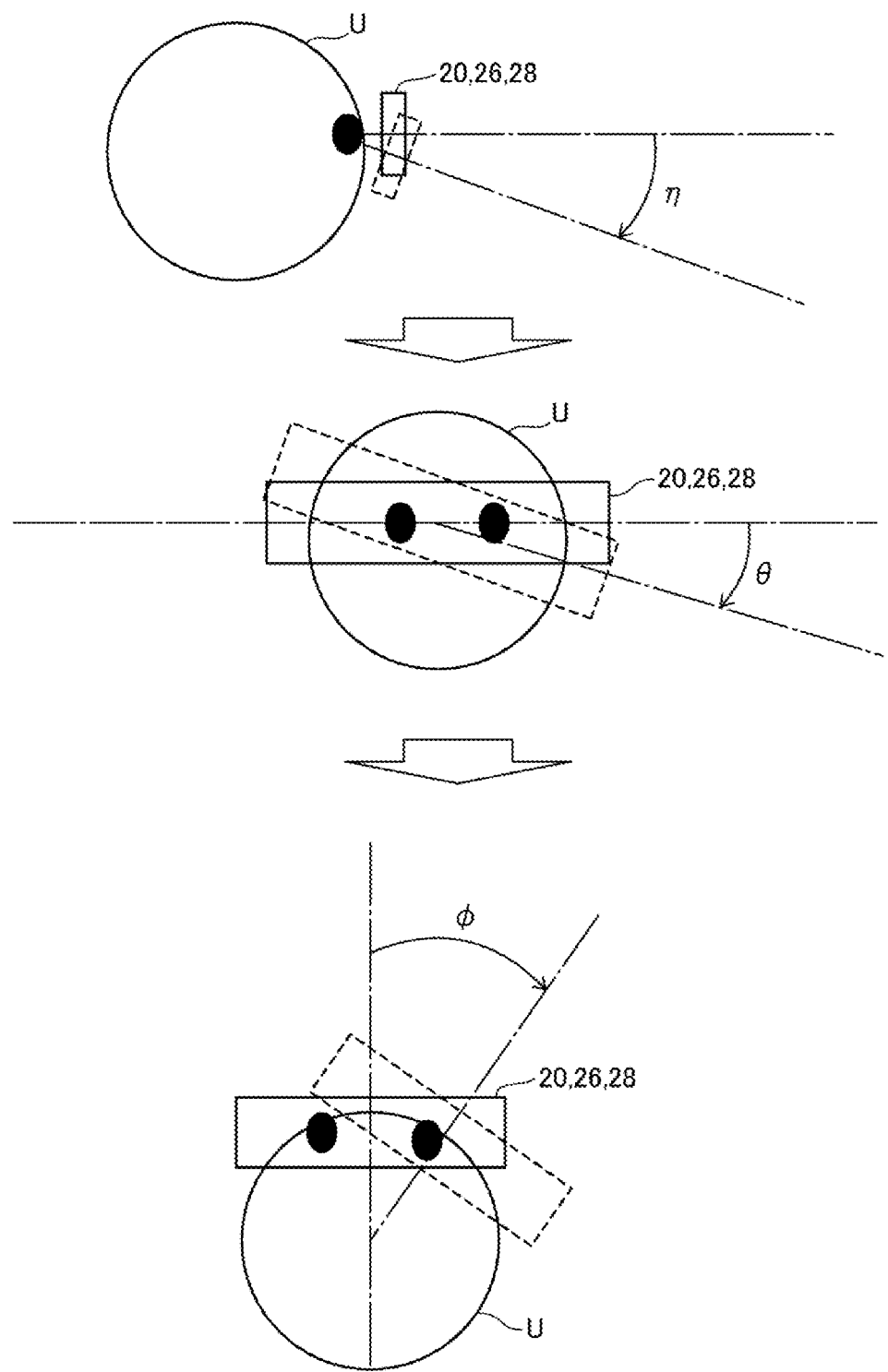
FIG. 6 is a diagram illustrating an example of movement of a head of a user.

FIG. 6 is a diagram illustrating an example of movement of the head of the user U.

An upper view of FIG. 6 illustrates the inclination angle η in the front-back direction of the head of the user U. The upper view of FIG. 6 is a side view of the head of the user U. The upper view of FIG. 6 illustrates the inclination angle η when a top of the head of the user U inclines in a front downward direction with respect to a neck. In other words, the inclination angle η when the user U faces downward is illustrated. However, in the upper view of FIG. 6, movement of the head of the user U in the front-back direction and an up-down direction is not considered. That is, in the upper view of FIG. 6, for convenience, the head of the user U is depicted as rotating clockwise about a center position of the head virtually.

The inclination angle η indicates, for example, an inclination with respect to a horizontal direction. In other words, the inclination angle η indicates, for example, an inclination of the head of the user U with respect to the front direction.

Note that, when the top of the head of the user U inclines backward and downward with respect to the neck, that is, when the user U faces upward, the inclination angle η indicates an angle in an opposite direction to the inclination angle η illustrated in the upper view of FIG. 6, that is, in a counterclockwise direction. In this case, the inclination angle η is a negative value.

The inclination angle η is detected by the first detector 123. Furthermore, when the inclination angle η is a positive value, the display region ARP moves downward relative to the specific object ST. This case will be described in detail below with reference to FIG. 7.

A middle view of FIG. 6 illustrates the inclination angle θ in the left-right direction of the head of the user U. The middle view of FIG. 6 is a front view of the head of the user U. The middle view of FIG. 6 illustrates the inclination angle θ when the top of the head of the user U inclines rightward with respect to the neck. However, in the middle view of FIG. 6, movement of the head of the user U in the left-right direction and the up-down direction is not considered. That is, in the middle view of FIG. 6, for convenience, the head of the user U is depicted as rotating clockwise about the center position of the head virtually.

The inclination angle θ indicates, for example, an inclination with respect to the horizontal direction.

Note that, when the top of the head of the user U inclines leftward with respect to the neck, the inclination angle θ indicates an angle in an opposite direction to the inclination angle θ illustrated in the middle view of FIG. 6, that is, in a counterclockwise direction. In this case, the inclination angle θ is a negative value.

The inclination angle θ is detected by the first detector 123. Furthermore, when the inclination angle θ is a positive value, the display region ARP inclines relative to the specific object ST. This case will be described in detail with reference to FIG. 8 and FIG. 9.

A lower view of FIG. 6 illustrates the angle φ formed by the front direction of the user U and the left-right direction of the head. The lower view of FIG. 6 is a plan view of the head of the user U. The lower view of FIG. 6 indicates the angle φ when the head of the user U faces rightward with respect to the front direction of the user U. However, in the lower view of FIG. 6, movement of the head of the user U in the front-back direction and the up-down direction is not considered. That is, in the lower view of FIG. 6, for convenience, the head of the user U is depicted as rotating clockwise about the center position of the head virtually.

Note that, when the head of the user U faces leftward with respect to the front direction of the user U, the angle φ indicates an angle in an opposite direction to the angle φ illustrated in the lower view of FIG. 6, that is, in a counterclockwise direction. In this case, the inclination angle φ is a negative value.

The angle φ is detected by the second detector 127. Further, the second display control unit 130, based on a detection result in the second detector 127, displays the second image P2 different from the first image P1 in the display region ARP. Specifically, when an absolute value of the angle φ is equal to or larger than a threshold angle, the second display control unit 130 displays the second image P2 in the display region ARP. This case will be described in detail below with reference to FIG. 10.

2-2. Description of Processing of First Adjustment Unit

Figure 7:
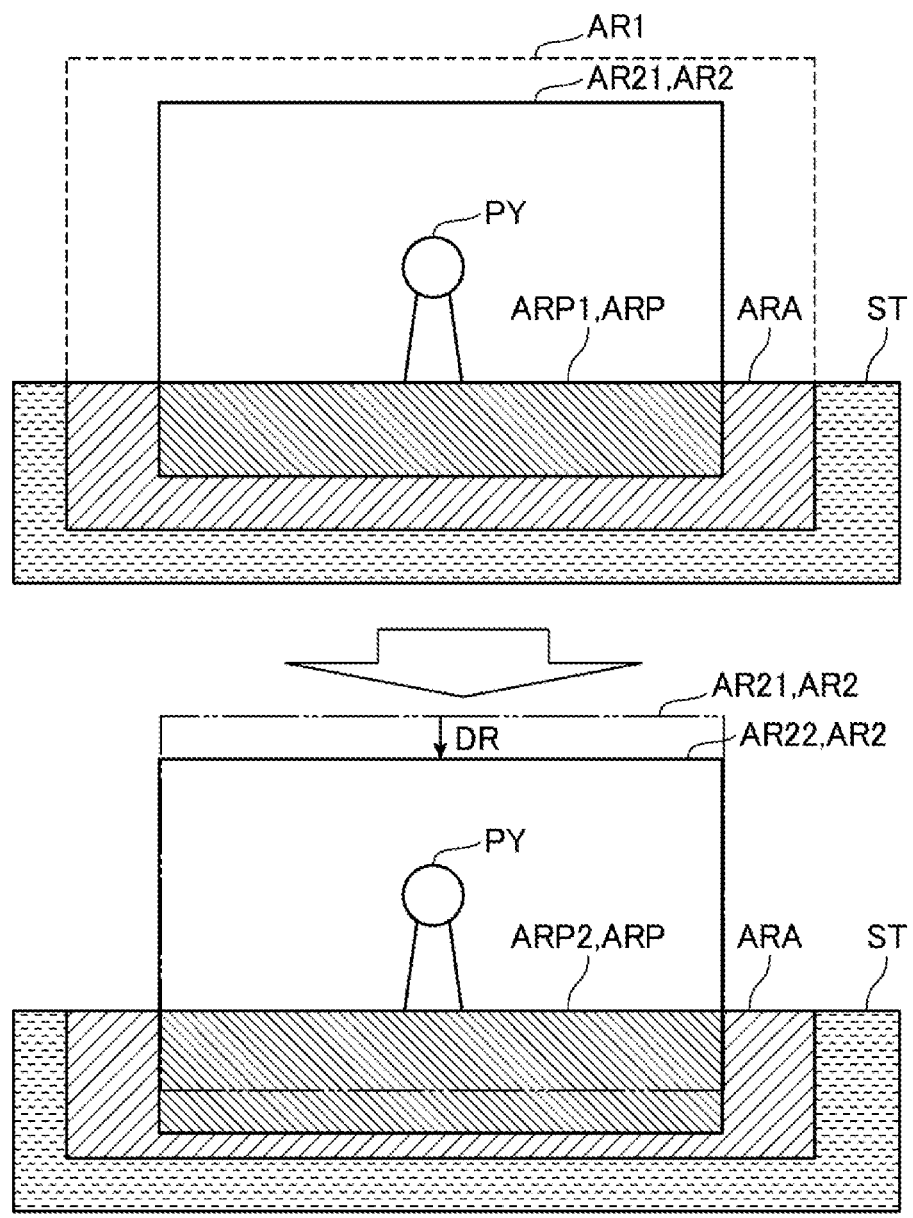
FIG. 7 is a diagram illustrating an example when an inclination angle in a front-back direction of the head of the user changes.

FIG. 7 is a diagram illustrating an example when the inclination angle η in the front-back direction of the head of the user U changes. An upper view of FIG. 7 is a diagram illustrating an example of the display region ARP when the inclination angle η is zero. That is, the upper view of FIG. 7 is a diagram illustrating the display region ARP when the user U faces forward.

The first adjustment unit 124 virtually fixes the displayable region ARA to the specific object ST, and adjusts the display region ARP to be a region where the displayable region ARA overlaps with the image display region AR2. The displayable region ARA indicates a region in which the first image P1 is displayable. The image display region AR2 indicates a region in which the image display unit 20 displays an image. In other words, the image display region AR2 indicates a region corresponding to each of the right light-guiding plate 26 and the left light-guiding plate 28.

In the present exemplary embodiment, the image display region AR2 is included in the imaging region AR1. The imaging region AR1 indicates a region captured by the first camera 61.

In the present exemplary embodiment, a case where the specific object ST is a side of the stage will be described. On the stage, for example, the performer PY performs an opera.

In the present exemplary embodiment, the displayable region ARA is arranged on an upper portion of the side of the stage, that is the specific object ST. The displayable region ARA is a rectangular region.

When the user U, for example, manipulates the cross key (not illustrated) disposed on the connection device 10, the second determination unit 122 determines the displayable region ARA. Specifically, the user U specifies a position of an upper left vertex and a position of a lower right vertex of four corners of the displayable region ARA, to determine the displayable region ARA.

In the present exemplary embodiment, the second determination unit 122 determines the displayable region ARA based on an operation by the user U, but exemplary embodiments of the present disclosure are not limited thereto. It is sufficient that the second determination unit 122 determines the displayable region ARA. The second determination unit 122, for example, when the user U faces forward, may determine to set the displayable region ARA to a region where the imaging region AR1 overlaps with the specific object ST.

In addition, in the present exemplary embodiment, when the user U manipulates the cross key (not illustrated) disposed on the connection device 10, the second determination unit 122 determines the displayable region ARA, but exemplary embodiments of the present disclosure are not limited thereto. It is sufficient that, based on an operation by the user U, the second determination unit 122 determines the displayable region ARA. For example, as in an action UI, based on an operation that the user U traces the four corners of the displayable region ARA with a finger, the second determination unit 122 may determine the displayable region ARA. Further, for example, when the user U specifies a center position of the displayable region ARA, and the user U performs an operation for enlarging a diagonal line in a multi-touch manner, the second determination unit 122 may determine the displayable region ARA. Furthermore, for example, when a region around the stage is detected by image recognition, a plurality of candidates for the displayable regions ARA is caused to be displayed, the user U selects one number of the displayable region ARA from among the plurality of candidates for the displayable region ARA, and the second determination unit 122 may determine the displayable region ARA.

Positioned at a center of the imaging region AR1 is the performer PY. In the present exemplary embodiment, a case will be described where the displayable region ARA is determined by the second determination unit 122, when the head of the user U faces forward, that is, in an initial state, as a region where the imaging region AR1 overlaps with the specific object ST.

A first image display region AR21 indicates the image display region AR2, when the head of the user U faces forward, that is, in the initial state.

A first image display region ARP1 indicates the image display region ARP, when the head of the user U faces forward, that is, in the initial state.

The first adjustment unit 124 adjusts the first display region ARP1 to be a region where the first image display region AR21 overlaps with the displayable region ARA.

A lower view of FIG. 7 is a diagram illustrating an example of the display region ARP when the inclination angle η is positive. In other words, the lower view of FIG. 7 is a diagram illustrating the display region ARP when the user U faces diagonally downward.

Along with a change in the inclination angle η from zero to a positive value, the image display region AR2 moves in a lower direction DR. As a result, the display region ARP changes from the first image display region AR21 to the second image display region AR22. The second image display region AR22 indicates the image display region AR2 when the user U faces diagonally downward.

The first adjustment unit 124 adjusts the display region ARP to be a region where the second image display region AR22 overlaps with the displayable region ARA. In other words, the display region ARP changes from the first display region ARP1 to the second display region ARP2.

The second display region ARP2, is identical in size in the left-right direction, and is larger in size in the up-down direction, in comparison to the first display region ARP1.

In the present exemplary embodiment, an image of the character string TX corresponding to a sound produced by the performer PY is displayed as the first image P1 in the display region ARP. Character string information corresponding to the sound produced by the performer PY is transmitted from the smart phone 300, for example.

Specifically, the sound produced by the performer PY is input to, for example, a microphone disposed on the smart phone 300, and the second control unit 310 of the smart phone 300 generates character string information corresponding to the sound. Then, the control unit of the smart phone 300 generates an image of the character string TX corresponding to the generated character string information as the first image P1. The second control unit 310 of the smart phone 300 transmits information indicating the generated first image P1 to the first control unit 120 of the connection device 10 of the HMD 100.

The character string TX will be described in detail below with reference to FIG. 9.

In the lower view of FIG. 7, the display region ARP when the inclination angle η is positive, that is, the second display region ARP2 is illustrated, but when the inclination angle η is negative, the display region ARP is, compared to the first display region ARP1, identical in size in the left-right direction and smaller in size in the up-down direction. A case where the inclination angle η is negative, corresponds to a case where the user U faces diagonally upward.

Figure 8:
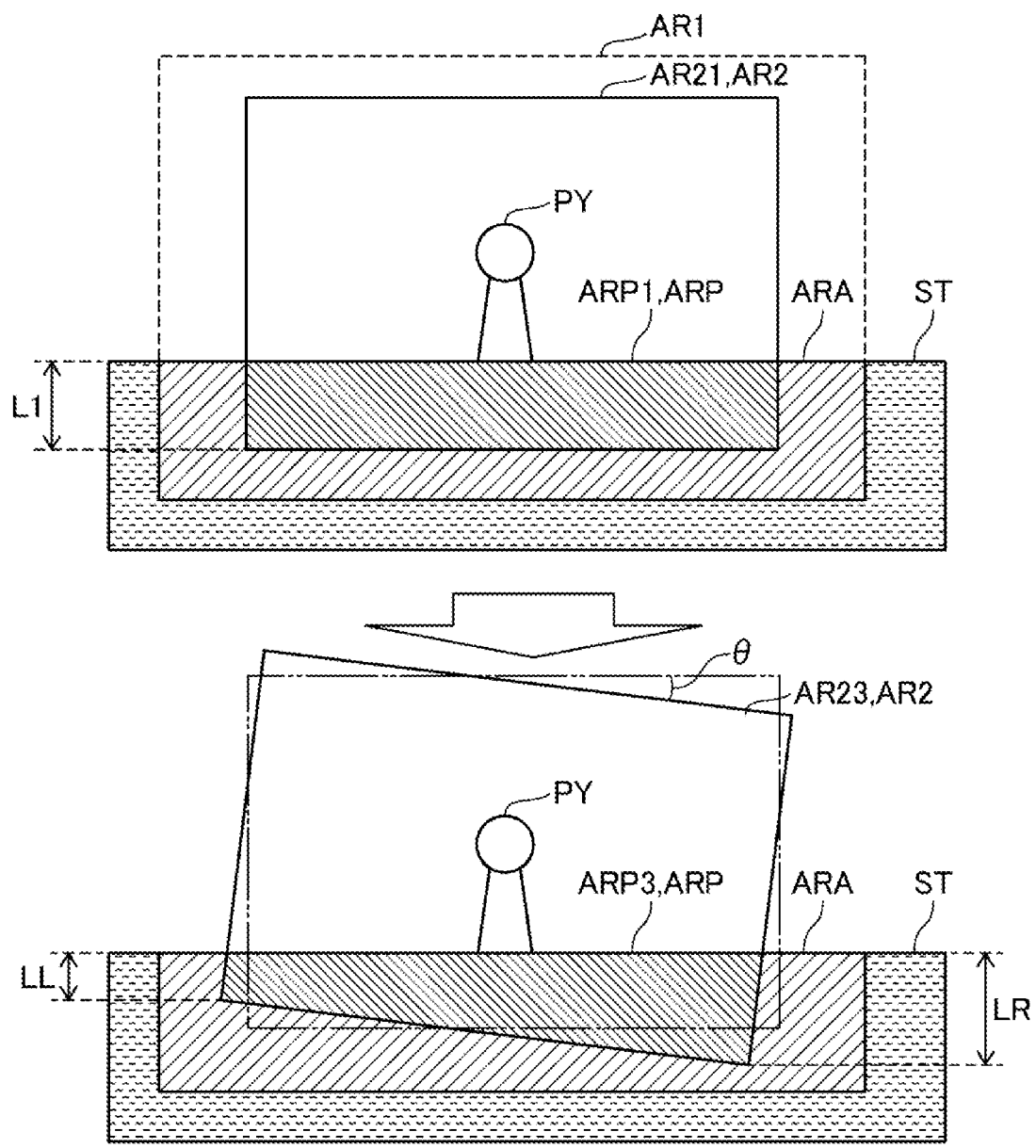
FIG. 8 is a diagram illustrating an example when an inclination angle in a left-right direction of the head of the user changes.

FIG. 8 is a diagram illustrating an example when the inclination angle θ in the left-right direction of the head of the user U changes. An upper view of FIG. 8 is a diagram illustrating the display region ARP when the inclination angle θ is zero. In other words, the upper view of FIG. 8 is a diagram illustrating the display region ARP when the user U faces forward, that is, the first display region ARP1. The upper view of FIG. 8 is identical to the upper view of FIG. 7, and thus description thereof will be omitted.

A lower view of FIG. 8 is a diagram illustrating the display region ARP when the inclination angle θ is positive. In other words, the lower view of FIG. 8 is a diagram illustrating the display region ARP when the head of the user U inclines rightward.

Along with a change in the inclination angle θ from zero to a positive value, the image display region AR2 inclines clockwise by the inclination angle θ. As a result, the image display region AR2 changes from the first image display region AR21 to a third image display region AR23. The third image display region AR23 indicates the image display region AR2 when the head of the user U inclines rightward.

The first adjustment unit 124 adjusts the display region ARP to be a region where the third image display region AR23 overlaps with the displayable region ARA. In other words, the display region ARP changes from the first display region ARP1 to the third display region ARP3.

The third display region ARP3 is a trapezoidal region with a lower end portion on a left side of the third image display region AR23 as an upper base, and a lower end portion on a right side of the third image display region AR23 as a lower base. A length LL in the up-down direction on a left end of the third display region ARP3 is smaller than a length L1 in the up-down direction of the first display region ARP1, and a length LR in the up-down direction on a right end of the third display region ARP3 is larger than a length L1 in the up-down direction of the first display region ARP1.

In the lower view of FIG. 8, the display region ARP is illustrated when the inclination angle θ is positive, but when the inclination angle θ is negative, the display region ARP is a trapezoidal region obtained by inverting the third image display region AR23 in the left-right direction. That is, the length LR in the up-down direction on a left end of the display region ARP is larger than the length L1 in the up-down direction of the first display region ARP1, and the length LL in the up-down direction on the right end of the third display region ARP3 is smaller than the length L1 in the up-down direction of the first display region ARP1.

2-3. Description of Processing of Second Adjustment Unit

Figure 9:
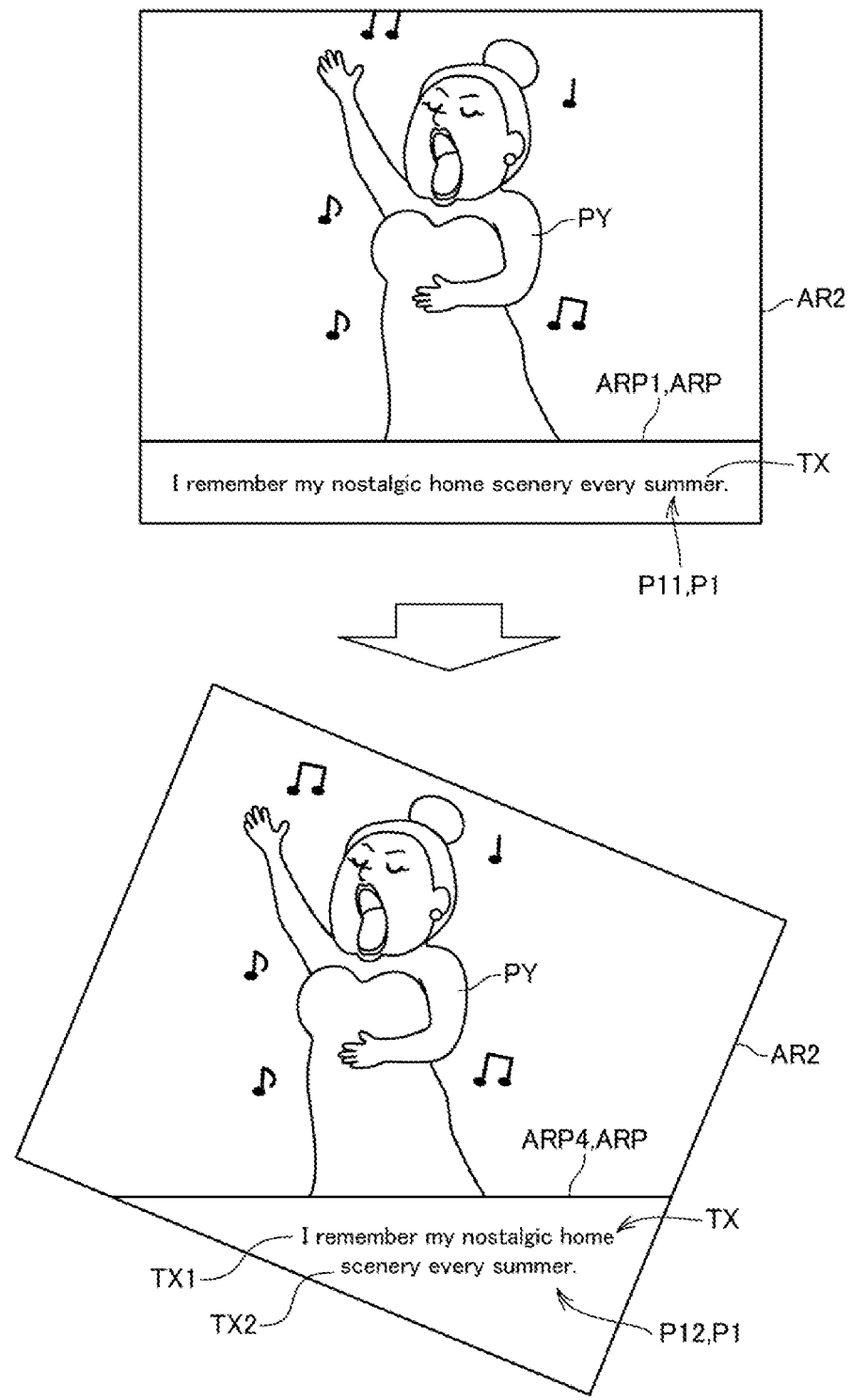
FIG. 9 is a diagram illustrating another example when the inclination angle in the left-right direction of the head of the user changes.

FIG. 9 is a diagram illustrating another example when the inclination angle θ in the left-right direction of the head of the user U changes.

An upper view of FIG. 9 is a diagram illustrating an example of the display region ARP when the inclination angle θ is zero. When the inclination angle θ is zero, the display region ARP is the first display region ARP1 that is rectangular, as described with reference to FIG. 8.

The second display control unit 130 displays, in the first display region ARP1, as the first image P1, an image indicating the character string TX.

In the present exemplary embodiment, the second adjustment unit 125 adjusts the number of lines of the character string TX displayed in the first display region ARP1 to be one. In other words, the image P11 of the character string TX in one line is displayed in the first display region ARP1.

Specifically, the image P11 indicating the character string TX in one line of "I remember my nostalgic home scenery every summer". is displayed in the first display region ARP1.

A lower view of FIG. 9 is a diagram illustrating an example of the display region ARP when the inclination angle θ is positive. In the lower view of FIG. 9, a value of the inclination angle θ is larger than that in the case of the lower view of FIG. 8, thus the display region ARP is a triangular region rather than a trapezoidal region. A fourth display region ARP4 indicates the display region ARP in the lower view of FIG. 9. As described with reference to FIG. 8, the fourth display region ARP4 is, based on the inclination angle θ detected by the first detector 123, adjusted by the first adjustment unit 124.

The second adjustment unit 125, based on an adjustment result in the first adjustment unit 124, adjusts the number of lines NL of the character string TX displayed in the display region ARP.

In the lower view of FIG. 9, the second adjustment unit 125 adjusts the number of lines NL of the character string TX displayed in the display region ARP to be two.

Specifically, since a length in the left-right direction of the fourth display region ARP4 is smaller than a length in the left-right direction of the first display region ARP1, the image P12 in which the character string TX is described in two lines, is displayed in the fourth display region ARP4. More specifically, in a first line, an image displaying a first character string TX1 of "I remember my nostalgic home" is displayed, and on a second line, an image displaying a second character string TX2 of "scenery every summer". is displayed.

2-4. Description of Processing of Second Display Control Unit

Figure 10:
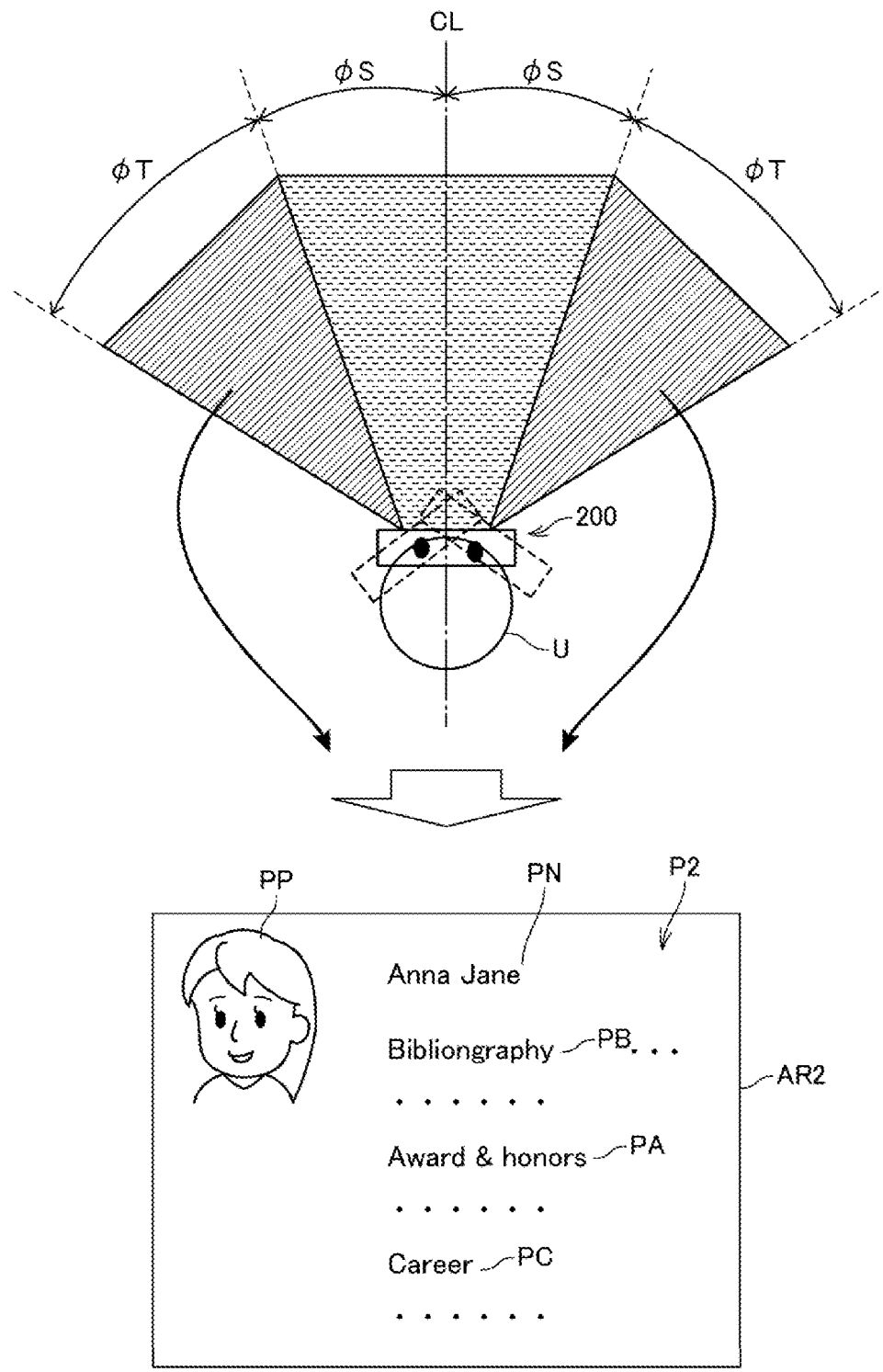
FIG. 10 is a diagram illustrating an example when an orientation in the left-right direction of the head of the user changes.

FIG. 10 is a diagram illustrating an example when the orientation in the left-right direction of the head of the user U changes. The second detector 127 detects the angle φ formed by the front direction of the user U and the orientation in the left-right direction of the head.

An upper view of FIG. 10 is a plan view illustrating an example of a range of the angle φ. A straight line CL indicates the front direction of the user U. When the angle φ is, for example, equal to or larger than −φS and equal to or less than +φS, the second display control unit 130 displays the first image P1 in the display region ARP. The threshold angle φS is, for example, 25 degrees.

Further, when the angle φ is, for example, equal to or larger than −(φS+φT) and less than −φS, or larger than +φS and equal to or less than +(φS+φT), the second display control unit 130 displays the second image P2 in the image display region AR2 including the display region ARP. The angle φT is, for example, 20 degrees.

A lower view of FIG. 10 is a diagram illustrating an example of the second image P2. The second image P2 illustrates, for example, a profile of the performer PY.

The second image P2 includes a performer image PP, a name image PN, a bibliography image PB, an award and honors image PA, and a career image PC. The performer image PP illustrates a photograph of the performer PY. The name image PN is a character image illustrating a name of the performer PY. The bibliography image PB is a character image illustrating bibliography information of the performer PY. The award and honors image PA is a character image illustrating an award-winning history of the performer PY. The career image PC is a character image illustrating a career of the performer PY.

The user U, in order for the angle φ to be equal to or larger than −(φS+φT), and less than −φS, or larger than +φS and equal to or less than +(φS+φT), can adjust the orientation in the left-right direction of the head, to display the second image P2 illustrating the profile of the performer PY in the image display region AR2. Thus, convenience for the user U can be improved.

Note that, in the present exemplary embodiment, the second image P2 illustrates the profile of the performer PY, but exemplary embodiments of the present disclosure are not limited thereto. It is sufficient that the second image P2 is an image different from the first image P1. The second image P2 may be, for example, an image displaying a schedule of an opera during the performance. Alternatively, an embodiment may be adopted in which the user U can set the second image P2.

3. Description of Processing of First Control Unit

Figure 11:
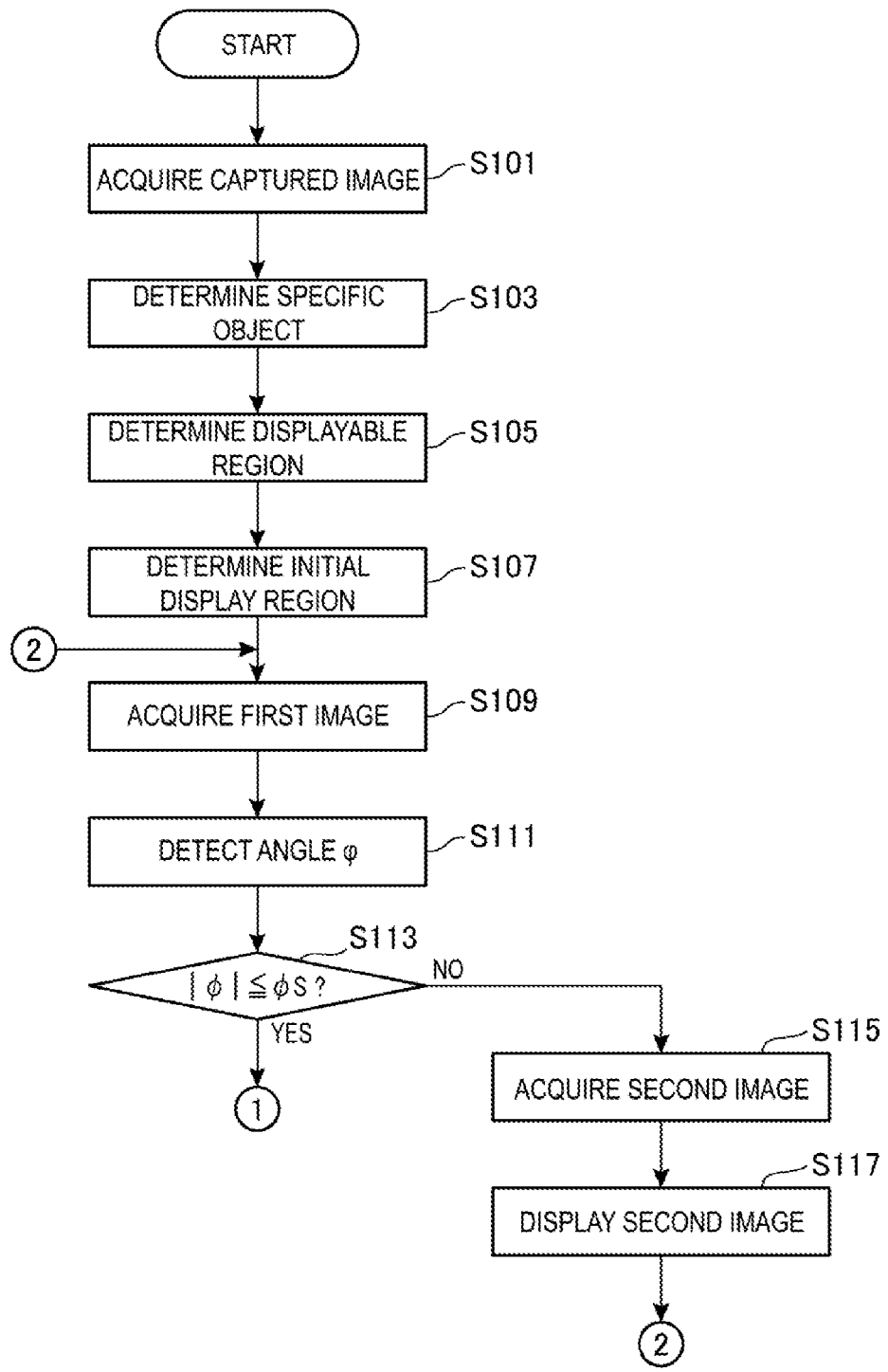
FIG. 11 is a flowchart illustrating an example of main processing of the first control unit.
Figure 12:
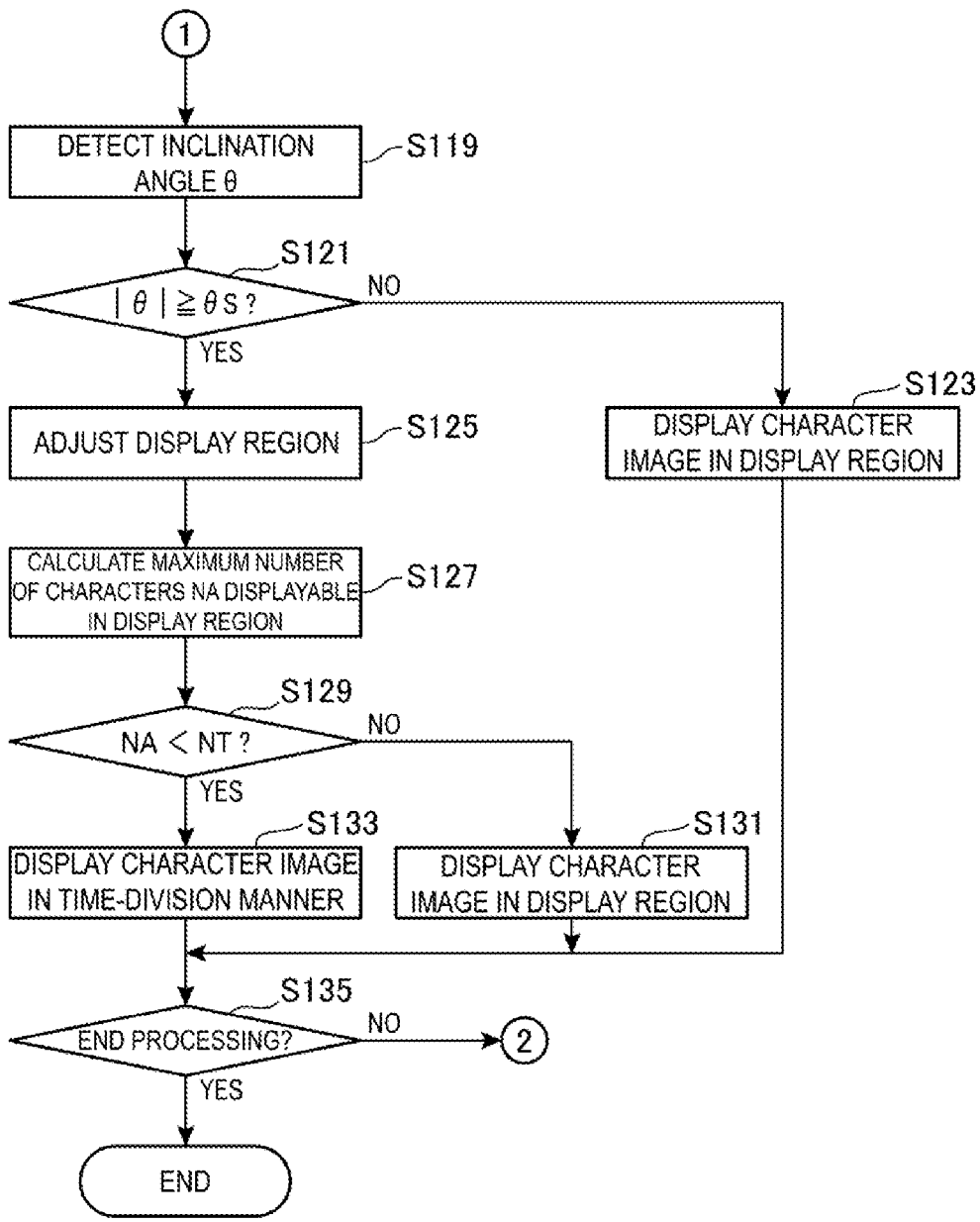
FIG. 12 is a flowchart illustrating the example of the main processing of the first control unit.

FIG. 11 and FIG. 12 are flowcharts illustrating an example of main processing of the first control unit 120.

First, as illustrated in FIG. 11, in step S101, the first control unit 120 acquires a captured image captured by the camera 61.

Next, in step S103, the first determination unit 121, based on the captured image captured by the first camera 61, determines the specific object ST.

Next, in step S105, the second determination unit 122, based on the captured image captured by the first camera 61, determines the displayable region ARA.

Next, in step S107, the first adjustment unit 124 determines the display region ARP in an initial state. Specifically, the first adjustment unit 124, when the head of the user U faces forward, determines the display region ARP as a region where the image display region AR2 overlaps with the displayable region ARA.

Next, in step S109, the first control unit 120 acquires the first image P1 from the smart phone 300. The first image P1 indicates the character string TX.

Next, in step S111, the second detector 127 detects an orientation in the left-right direction of the head of the user U. Specifically, the second detector 127 detects the angle φ formed by the front direction of the user U and an orientation in the left-right direction of the head.

Next, in step S113, the second display control unit 130 determines whether or not an absolute value of the angle φ is equal to or less than the threshold angle φS. The threshold angle φS is, for example, 25 degrees.

When the second display control unit 130 determines that the absolute value of the angle φ is equal to or less than the threshold angle φS (step S113; YES), the processing proceeds to step S119 illustrated in FIG. 12. When the second display control unit 130 determines that the absolute value of the angle φ is larger than the threshold angle φS (step S113; NO), the processing proceeds to step S115.

Then, in step S115, the first control unit 120 acquires the second image P2 from the smart phone 300.

Next, in step S117, the second display control unit 130 displays the second image P2 in the image display region AR2. The process then returns to step S109.

Next, when the second display control unit 130 determines that the absolute value of the angle φ is equal to or less than the threshold angle φS (step S113; YES), as illustrated in FIG. 12, in step S119, the first detector 123 detects the inclination angle θ in the left-right direction of the head of the user U.

Next, in step S121, the first adjustment unit 124 determines whether the absolute value of the inclination angle θ is equal to or larger than the threshold angle θS or not. The threshold angle θS is, for example, 5 degrees.

When the first adjustment unit 124 determines that the absolute value of the inclination angle θ is equal to or larger than the threshold angle θS (step S121; YES), the processing proceeds to step S125. When the first adjustment unit 124 determines that the absolute value of the inclination angle θ is less than the threshold angle θS (step S121; NO), the processing proceeds to step S123.

Then, in step S123, the second display control unit 130 displays the first image P1 in the display region ARP. Subsequently, the processing proceeds to step S135.

When the second display control unit 130 determines that the absolute value of the angle φ is equal to or less than the threshold angle φS (step S113; YES), in step S125, the first adjustment unit 124, based on the detection result in the first detector 123, adjusts the display region ARP of the first image P1. Specifically, the first adjustment unit 124 adjusts the display region ARP to be a region where the displayable region ARA overlaps with the image display region AR2.

Next, in step S127, the determining unit 126 calculates the maximum number of characters NA that is displayable in the display region ARP.

Next, in step S129, the determining unit 126 determines whether the maximum number of characters NA is less than the number of characters NT or not. The number of characters NT indicates the number of characters of the character string TX corresponding to the first image P1.

When the determining unit 126 determines that the maximum number of characters NA is not less than the number of characters NT (step S129; NO), the processing proceeds to step S131.

Then, in step S131, the second display control unit 130 displays the first image P1 in the display region ARP. Subsequently, the processing proceeds to step S135.

When the determining unit 126 determines that the maximum number of characters NA is less than the number of characters NT (step S129; YES), the processing proceeds to step S133.

Then, in step S133, the second display control unit 130 causes the first image P1 to be displayed in the display region ARP in a time-division manner.

Then, in step S135, the first control unit 120 determines whether to end the processing or not.

When the first control unit 120 determines not to end the processing (step S135; NO), the processing returns to step S109 in FIG. 11. When the first control unit 120 determines to end the processing (step S135; YES), the processing is ended.

Note that, step S119 in FIG. 11 correspond to an example of a "detection step". Step S125 in FIG. 12 corresponds to an example of an "adjustment step". Step S131 in FIG. 12 also corresponds to an example of a "display control step".

In the flowchart illustrated in FIG. 12, when the absolute value of the inclination angle θ is equal to or less than the threshold angle θS, the first adjustment unit 124 does not adjust the display region ARP of the first image P1. In this manner, throughput of the first control unit 120 can be reduced.

4. Effects of Exemplary Embodiment

As described above, the HMD 100 according to the present exemplary embodiment is the HMD 100 mounted on the head of the user U, and includes the image display unit 20 located on the left eye side and the right eye side of the user U, and overlapping and displaying the first image P1 on the outside scene, the first detector 123 detecting an inclination of the head, the first adjustment unit 124 for, based on a detection result in the first detector 123, adjusting the display region ARP of the first image P1, and the second display control unit 130 for, based on an adjustment result in the first adjustment unit 124, causing the first image P1 to be displayed in the display region ARP.

Thus, based on the inclination of the head of the user U, the display region ARP of the first image P1 is adjusted, thus it is possible to suppress, in the first image P1 displayed in the display region ARP and in the outside scene, overlapping with a position of a target object that the user wants to visually recognize. The target object is, for example, the performer PY.

Further, the camera 61 for capturing an outside scene and generating a captured image is provided, and the first adjustment unit 124, based on a position of the specific object ST included in the captured image, adjusts the display region ARP of the first image P1.

Thus, based on the position of the specific object ST included in the captured image, the display region ARP of the first image P1 is adjusted, thus by appropriately selecting the specific object ST, the display region ARP can be appropriately adjusted. Thus, overlapping of the first image P1 with a position of a target object that the user wants to visually recognize can be suppressed.

Further, the first determination unit 121 that, based on a captured image, determines the specific object ST is provided.

Accordingly, the specific object ST is determined based on the captured image, thus it is possible to appropriately determine the specific object ST.

Further, the first adjustment unit 124 fixes the displayable region ARA that indicates a region in which the first image P1 is displayable to the specific object ST, and adjusts the display region ARP to be a region where the image display region AR2 indicating a region in which the image display unit 20 displays an image overlaps with the displayable region ARA.

Accordingly, the display region ARP is adjusted to be a region where the image display region AR2 overlaps with the displayable region ARA, thus the display region ARP can be appropriately adjusted.

Further, the second determination unit 122 that, based on a captured image, determines the displayable region ARA is provided. Accordingly, the displayable region ARA can be appropriately determined.

Further, the first image P1 is an image displaying the character string TX, the second adjustment unit 125 that, based on an adjustment result in the first adjustment unit 124, adjusts the number of lines NL of the character string TX displayed in the display region ARP is provided, and the second display control unit 130 displays the character string TX in the display region ARP using the number of lines NL.

Accordingly, in accordance with the display region ARP, the number of lines NL of the character strings TX displayed in the display region ARP is adjusted, thus the character string TX can be appropriately displayed in the display region ARP.

Further, the determining unit 126 that determines whether an entirety of the first image P1 is displayable in the display region ARP or not is provided, and when the determining unit 126 determines that the entirety of the first image P1 is not displayable in the display region ARP, the second display control unit 130 causes the first image P1 to be displayed in the display region ARP in a time-division manner.

Thus, when the entirety of the first image P1 is not displayable in the display region ARP, the second display control unit 130 causes the first image P1 to be displayed in the display region ARP in a time-division manner, thus the user U can visually recognize the entirety of the first image P1.

Further, the second detector 127 that detects an orientation in the left-right direction of the head of the user U is provided, and the second display control unit 130, based on a detection result in the second detector 127, displays the second image P2 different from the first image P1 on the image display unit 20.

Thus, the user U, by adjusting the orientation in the left-right direction of the head of the user U, can visually recognize the second image P2 different from the first image P1. Thus, convenience for the user U can be improved.

Further, the second display control unit 130, when the angle φ formed by the front direction of the user U and the orientation in left-right direction of the head is equal to or larger than the threshold angle φS, displays the second image P2 on the image display unit 20.

Thus, the user U can adjust the orientation in the left-right direction of the head so that the angle φ reaches or exceeds the threshold angle φS, to visually recognize the second image P2. Thus, convenience for the user U can be improved.

Further, the third detector 128 that detects a distance to and from the specific object ST, and the third adjustment unit 129 that, based on a detection result in the third detector 128, adjusts a display position in the front-back direction of the first image P1 are provided, and the second display control unit 130, based on an adjustment result in the third adjustment unit 129, displays the first image P1 on the image display unit 20.

Accordingly, based on the distance to and from the specific object ST, the display position in the front-back direction of the first image P1 is adjusted, thus a virtual display position of the first image P1 in the front-back direction of the user U in a real space can be appropriately adjusted.

A control program for the HMD 100 according to the present exemplary embodiment is a control program for the HMD 100 mounted on a head of the user U, and including the image display unit 20 located on a left eye side and a right eye side of the user U, and overlapping and displaying the first image P1 on an outside scene, and the first processor 120A, wherein the first processor 120A is caused to function as the first detector 123 for detecting an inclination of the head of the user U, as the first adjustment unit 124 for, based on a detection result in the first detector 123, adjusting the display region ARP of the first image P1, and as the second display control unit 130 for, based on an adjustment result in the first adjustment unit 124, causing the first image P1 to be displayed in the display region ARP.

Thus, based on the inclination of the head of the user U, the display region ARP of the first image P1 is adjusted, thus it is possible to suppress, in the first image P1 displayed in the display region ARP and in the outside scene, overlapping with a position of a target object that the user wants to visually recognize. The target object is, for example, the performer PY.

A control method for the HMD 100 according to the present exemplary embodiment is a control method for the HMD 100 mounted on a head of the user U, and including the image display unit 20 located on a left eye side and a right eye side of the user U, and overlapping and displaying the first image P1 on an outside scene, and the first processor 120A, wherein the first processor 120A includes a detection step of detecting an inclination of the head of the user U, an adjustment step of, based on a detection result in the detection step, adjusting the display region ARP of the first image P1, and a display control step of, based on an adjustment result in the adjustment step, causing the first image P1 to be displayed in the display region ARP.

Thus, based on the inclination of the head of the user U, the display region ARP of the first image P1 is adjusted, thus it is possible to suppress, in the first image P1 displayed in the display region ARP and in the outside scene, overlapping with a position of a target object that the user wants to visually recognize. The target object is, for example, the performer PY.

A display system 1 according to another exemplary embodiment of the present disclosure is the display system 1 including the HMD 100 mounted on a head of the user U, and the smart phone 300 coupled to the HMD 100, wherein the HMD 100 includes the image display unit 20 located on a left eye side and a right eye side of the user U, and overlapping and displaying the first image P1 on an outside scene, and the smart phone 300 includes the first detector 123 for detecting an inclination of the head of the user U, the first adjustment unit 124 for, based on a detection result in the first detector 123, adjusting the display region ARP of the first image P1, and the second display control unit 130 for, based on an adjustment result in the first adjustment unit 124, causing the first image P1 to be displayed in the display region ARP.

Thus, based on the inclination of the head of the user U, the display region ARP of the first image P1 is adjusted, thus it is possible to suppress, in the first image P1 displayed in the display region ARP and in the outside scene, overlapping with a position of a target object that the user wants to visually recognize. The target object is, for example, the performer PY.

5. Other Exemplary Embodiments

The present disclosure is not limited to the configurations in the exemplary embodiment described above, and can be implemented in various aspects without departing from the gist of the disclosure.

For example, in the exemplary embodiment described above, the HMD 100 displays the first image P1 on the left eye side and the right eye side of the user U, but exemplary embodiments of the present disclosure are not limited thereto. It is sufficient that the HMD 100 is located on at least one of a left eye side and a right eye side of the user U, and overlaps and displays the first image P1 on the outside scene. That is, it is sufficient that, the HMD 100 includes at least one of the right display unit 22 and the right light-guiding plate 26, and the left display unit 24 and the left light-guiding plate 28. For example, it is also possible that the HMD 100 includes the right display unit 22 and right light-guiding plate 26, and does not include the left display unit 24 and the left light-guiding plate 28. Further, for example, it is possible that the HMD 100 includes the left display unit 24 and the left light-guiding plate 28, and does not include the right display unit 22 and the right light-guiding plate 26.

Further, in the above exemplary embodiment, the "information processing device" is the smart phone 300, but the present disclosure is not limited thereto. It is sufficient that, the "information processing device" is configured to be portable by the user U, and includes a control unit. For example, the "information processing device" may be a PDA terminal or a tablet personal computer.

Further, in the exemplary embodiment described above, the configuration in which the connection device 10 is coupled to the image display unit 20 by wire has been illustrated, however, the present disclosure is not limited thereto, and a configuration may be adopted in which the image display unit 20 is coupled wirelessly to the connection device 10.

For example, in the exemplary embodiment described above, the configuration in which the connection device 10 is coupled to the smart phone 300 by wire has been illustrated, however, the present disclosure is not limited thereto, and a configuration may be adopted in which the smart phone 300 is coupled wirelessly to the connection device 10.

Additionally, a part of the functions of the connection device 10 may be provided in the image display unit 20, and the connection device 10 may be achieved by a plurality of devices. For example, instead of the connection device 10, a wearable device that can be attached to a body or clothes of the user U, or to personal adornments worn by the user may be used. The wearable device in such a case may be, for example, a watch-like device, a ring-like device, a laser pointer, a mouse, an air mouse, a game controller, a pen-like device, or the like.

In addition, in the exemplary embodiment described above, the configuration in which the image display unit 20 and the connection device 10 are separated, and are coupled to each other via the coupling cable 40 has been illustrated as an example. The disclosure is not limited to this, and a configuration may be adopted in which the connection device 10 and the image display unit 20 are integrally formed at and mounted on the head of the user U.

Further, in the exemplary embodiment described above, the configuration in which the user U visually recognizes the outside scene through the display unit is not limited to a configuration in which the right light-guiding plate 26 and the left light-guiding plate 28 transmit outside light. For example, the present disclosure is applicable to a display device configured to display an image in a state where an outside scene cannot be visually recognized. Specifically, the present disclosure can be applied to a display device for displaying a captured image by the camera 61, images based on image input from an outside, and the like. For example, with a configuration in which a composite image created by combining together an image of an outside scene captured by the camera 61, and the first image P1 is displayed by the image display unit 20, even when the image display unit 20 does not transmit outside light, the outside scene and the first image P1 can be displayed so as to be visible by the user U. Of course, it is also possible to apply the present disclosure to such a so-called video see-through display apparatus.

Additionally, for example, instead of the image display unit 20, an image display unit of another type such as an image display unit worn as a hat may be adopted, as long as the image display unit includes a display unit configured to display an image in correspondence to the left eye LE of the user U, and a display unit configured to display an image in correspondence to the right eye RE of the user U. Additionally, the display device may be configured, for example, as an HMD mounted on a vehicle such as a car and an airplane. Further, the display device may be configured, for example, as an HMD built into a body protector tool such as a helmet. In this case, a positioning portion to be positioned on the body of the user U, and a portion to be positioned to the configured portion may be a mounting portion.

Additionally, the configuration in which a virtual image is formed by the half mirrors 261 and 281 at a part of the right light-guiding plate 26 and the left light-guiding plate 28, as an optical system configured to guide imaging light to the eyes of the user U has been illustrated. The present disclosure is not limited thereto, and a configuration may be adopted in which an image is displayed either on an entire surface of the right light-guiding plate 26 and the left light-guiding plate 28, or in a display region having an area that occupies most part of the right light-guiding plate 26 and the left light-guiding plate 28. In such a case, a process for reducing an image may be included in an operation for changing a display position of the image.

In addition, the optical elements are not limited to the right light-guiding plate 26 and the left light-guiding plate 28 having half mirrors 261 and 281, but any optical components that allow the imaging light to enter the eyes of the user U, and specifically, diffraction grating, prisms, and holographic display units may be employed.

In addition, such a configuration may be adopted that at least some of the function blocks illustrated in FIG. 4 and FIG. 5 and the like are achieved with hardware, or achieved together with hardware and software, and the present disclosure is not limited to a configuration in which independent hardware resources are arranged as illustrated in the figures.

Additionally, a first control program executed by the first control unit 120 may be stored in the non-volatile storage unit 138 or another storage unit in the first control unit 120. Such a configuration may be adopted in which the second control program stored in external devices is acquired via a communication unit and the like and is executed.

Additionally, duplicate of a configuration formed in the connection device 10 may be formed in the image display unit 20. For example, a processor similar to the first processor in the connection device 10 may be arranged in the image display unit 20, or the first processor included in the connection device 10 and the processor of the image display unit 20 may be configured to perform separate functions.

Further, the processing units in the flowchart illustrated in FIG. 11 and FIG. 12 are obtained by dividing the processing based on main processing contents in order to facilitate the understanding of the processing in the first control unit 120 of the HMD 100. Exemplary embodiments will not be limited by the manner and name of division of the processing unit illustrated in the flowchart illustrated in FIG. 11 and FIG. 12. The processing of the first control unit 120 can be divided into more processing units in accordance with a processing content, and can be divided such that one processing unit includes more processing. An order of the processing in the above-described flowchart is also not limited to the illustrated example.

Furthermore, a part or all of the processing of the first control unit 120 may be executed by the second control unit 310.

Additionally, the control method of the HMD 100 can be realized by causing the first processor 120A included in the HMD 100 to execute the first control program corresponding to the control method for the HMD 100. Furthermore, the first control program can also be recorded in a recording medium recorded so as to be readable by a computer. The recording medium can be a magnetic recording medium, an optical recording medium, or a semiconductor memory device. Specifically, a portable or stationary type recording medium, such as a flexible disk, a Compact Disk Read Only Memory (CD-ROM), a Digital Versatile Disc (DVD), a Blu-ray (trade name) disc, a magneto-optical disc, a flash memory, a card type recording medium, or the like may be exemplified. The recording medium may be non-volatile storage devices such as a RAM, a ROM, and an HDD, all representing internal storages included in an image display apparatus. Additionally, the first control program corresponding to the control method for the HMD 100 is stored in a server apparatus or the like, and thus the control method for the HMD 100 can be achieved by downloading the first control program from the server apparatus, for example, via the smart phone 300, to the HMD 100.

What is claimed is:

1. A display device mounted at a head of a user, the display device comprising: a display unit located at at least one of a left eye side and a right eye side of the user, and configured to display a first image that is overlapped on an outside scene; a first detector configured to detect an inclination of the head; a first adjustment unit configured to, based on a detection result of the first detector, adjust a display region of the first image; a display control unit configured to, based on an adjustment result of the first adjustment unit, cause the first image to be displayed in the display region; an imaging unit configured to capture an image of the outside scene and generate a captured image, wherein the first adjustment unit adjusts, based on a position of a specific object included in the captured image, a display region of the first image, wherein the first image is an image displaying a character string; and a second adjustment unit adjusting, based on an adjustment result of the first adjustment unit, the number of lines of the character string displayed in the display region is provided, and the display control unit displays by the number of lines the character string in the display region.

2. The display device according to claim 1, comprising a first determination unit configured to, based on the captured image, determine the specific object.

3. The display device according to claim 1, wherein
the first adjustment unit fixes a displayable region indicating a region, in which the first image is displayable, to the specific object, and adjusts the display region to be a region, where an image display region indicating a region in which the display unit displays an image overlaps the displayable region.

4. The display device according to claim 3, comprising
a second determination unit configured to, based on the captured image, determine the displayable region.

5. The display device according to claim 1, comprising a determining unit configured to determine whether an entirety of the first image is able to be displayed in the display region, wherein
when the determining unit determines that the entirety of the first image is not able to be displayed in the display region, the display control unit causes the first image to be displayed in the display region in a time-division manner.

6. The display device according to claim 1, comprising a second detector configured to detect an orientation of the head in a left-right direction, wherein
the display control unit displays, based on a detection result of the second detector, a second image, which differs from the first image, at the display unit.

7. The display device according to claim 6, wherein
the display control unit displays, when an angle formed by a front direction of the user and an orientation of the head in the left-right direction is equal to or larger than a threshold angle, the second image at the display unit.

8. The display device according to claim 6, comprising:
a third detector configured to detect a distance to and from the specific object; and
a third adjustment unit configured to adjust, based on a detection result of the third detector, a display position in a front-back direction of the first image, wherein
the display control unit displays, based on an adjustment result of the third adjustment unit, the first image at the display unit.

9. A control program for a display device, the display device being mounted at a head of a user, including a display unit located at at least one of a left eye side and a right eye side of the user, and displaying a first image that is overlapped on an outside scene, and a computer, wherein the computer is caused to function as: a first detector configured to detect an inclination of the head; a first adjustment unit configured to adjust, based on a detection result of the first detector, a display region of the first image; a display control unit configured to cause, based on an adjustment result of the first adjustment unit, the first image to be displayed in the display region; an imaging unit configured to capture an image of the outside scene and generate a captured image, wherein the first adjustment unit adjusts, based on a position of a specific object included in the captured image, a display region of the first image, wherein the first image is an image displaying a character string; and a second adjustment unit adjusting, based on an adjustment result of the first adjustment unit, the number of lines of the character string displayed in the display region is provided, and the display control unit displays by the number of lines the character string in the display region.

10. A control method for a display device, the display device being mounted at a head of a user, including a display unit located at at least one of a left eye side and a right eye side of the user, and displaying a first image that is overlapped on an outside scene, and a computer, the control method, comprising: a detection step of detecting, by the computer, an inclination of the head; an adjustment step of adjusting, based on a detection result in the detection step, a display region of the first image; a display control step of causing, based on an adjustment result in the adjustment step, the first image to be displayed in the display region; a capturing step of capturing, by an imaging unit, an image of the outside scene and generating a captured image, wherein the adjustment step of adjusting, based on a position of a specific object included in the captured image, a display region of the first image, wherein the first image is an image displaying a character string; a second step of adjusting, based on the adjustment result of the adjustment step, the number of lines of the character string displayed in the display region is provided, and a second display control step of displaying by the number of lines the character string in the display region.

11. A display system, comprising: a display device mounted at a head of a user; and an information processing device coupled to the display device, wherein the display device includes a display unit located at at least one of a left eye side and a right eye side of the user, and displaying a first image that is overlapped on an outside scene, and the information processing device includes a first detector configured to detect an inclination of the head, a first adjustment unit configured to adjust, based on a detection result of the first detector, a display region of the first image, a display control unit configured to cause, based on an adjustment result of the first adjustment unit, the first image to be displayed in the display region; an imaging unit configured to capture an image of the outside scene and generate a captured image, wherein the first adjustment unit adjusts, based on a position of a specific object included in the captured image, a display region of the first image, wherein the first image is an image displaying a character string; and a second adjustment unit adjusting, based on an adjustment result of the first adjustment unit, the number of lines of the character string displayed in the display region is provided, and the display control unit displays by the number of lines the character string in the display region.

* * * * *